United States Patent
Negishi et al.

(10) Patent No.: US 8,575,048 B2
(45) Date of Patent: Nov. 5, 2013

(54) OPTICAL GLASS, PRECISION PRESS-MOLDING PREFORM, OPTICAL ELEMENT AND PROCESS FOR PRODUCING THE SAME

(75) Inventors: Tomoaki Negishi, Tokyo (JP); Yasuhiro Fujiwara, Tokyo (JP)

(73) Assignee: Hoya Corporation, Tokyo (JP)

( * ) Notice: Subject to any disclaimer, the term of this patent is extended or adjusted under 35 U.S.C. 154(b) by 90 days.

(21) Appl. No.: 12/893,563

(22) Filed: Sep. 29, 2010

(65) Prior Publication Data
US 2011/0105294 A1  May 5, 2011

(30) Foreign Application Priority Data

Sep. 30, 2009  (JP) ................................. 2009-226430
Sep. 10, 2010  (JP) ................................. 2010-202712

(51) Int. Cl.
  *C03C 3/14*  (2006.01)
  *C03C 3/15*  (2006.01)
  *C03C 3/068*  (2006.01)
  *C03C 3/066*  (2006.01)

(52) U.S. Cl.
  USPC .................... 501/50; 501/49; 501/78; 501/79

(58) Field of Classification Search
  USPC .................. 501/41, 49, 50, 51, 73, 77, 78, 79
  See application file for complete search history.

(56) References Cited

U.S. PATENT DOCUMENTS

| | | | |
|---|---|---|---|
| 2005/0197243 A1 | 9/2005 | Hayashi | |
| 2006/0105900 A1 | 5/2006 | Kasuga et al. | |
| 2007/0225148 A1* | 9/2007 | Hayashi et al. | 501/51 |
| 2008/0167172 A1* | 7/2008 | Hayashi | 501/51 |
| 2008/0293556 A1* | 11/2008 | Fujiwara | 501/78 |

FOREIGN PATENT DOCUMENTS

| | | |
|---|---|---|
| JP | 2005-247613 | 9/2005 |
| JP | 2006-137645 | 6/2006 |
| WO | 2008/050591 | 5/2008 |

* cited by examiner

*Primary Examiner* — Noah Wiese
(74) *Attorney, Agent, or Firm* — Nixon & Vanderhye P.C.

(57) ABSTRACT

[Problems to be Solved]
To provide a high-refractivity low-dispersion optical glass that enables the stable production of high-quality optical elements.
[Means to Solve the Problems]
An optical glass comprising, as essential components,
  20 to 50% of $B^{3+}$,
  5 to 35% of $La^{3+}$,
  1 to 30% of $Nb^{5+}$,
  0.5 to 15% of $Ta^{5+}$, and
  11 to 40% of $Zn^{2+}$,
the total content of $B^{3+}$ and $Si^{4+}$ being 20 to 50%, the total content of $La^{3+}$, $Gd^{3+}$ and $Y^{3+}$ being 5 to 35%, the cationic ratio of $((B^{3+}+Si^{4+})/(La^{3+}+Gd^{3+}+Y^{3+}))$ being from 1 to 5, the total content of $Ti^{4+}$, $Nb^{5+}$, $Ta^{5+}$ and $W^{6+}$ being 10 to 35%, the cationic ratio of $((Nb^{5+}+Ta^{5+})/(Ti^{4+}+Nb^{5+}+Ta^{5+}+W^{6+}))$ being from 0.7 to 1, the cationic ratio of $((B^{3+}+Si^{4+})/(Ti^{4+}+Nb^{5+}+Ta^{5+}+W^{6+}))$ being from 0.5 to 4, the cationic ratio of $((La^{3+}+Gd^{3+}+Y^{3+})/(Ti^{4+}+Nb^{5+}+Ta^{5+}+W^{6+}))$ being from 0.2 to 3, the cationic ratio of $Zn^{2+}/Zn^{2+}+Mg^{2+}+Ca^{2+}+Sr^{2+}+Ba^{2+})$ being from 0.8 to 1, the optical glass having a refractive index nd of 1.89 or more and an Abbe's number vd of 27 to 37.

25 Claims, 3 Drawing Sheets

US 8,575,048 B2

OPTICAL GLASS, PRECISION PRESS-MOLDING PREFORM, OPTICAL ELEMENT AND PROCESS FOR PRODUCING THE SAME

TECHNICAL FIELD

This invention relates to an optical glass having a refractive index nd of 1.89 or more and an Abbe's number vd of 27 to 37, a precision press-molding preform and an optical element and processes for producing the same.

BACKGROUND ART

A high-refractivity low-dispersion optical glass is much demanded as optical element materials such as various lenses. For example, it can constitute a compact and highly functional optical system for correcting chromatic aberration when combined with a high-refractivity high-dispersion lens.

Further, when the optical function surface of a high-refractivity low-dispersion lens is rendered aspherical, various optical systems can be functionally enhanced and downsized.

A precision press-molding method is known as a method of efficiently producing optical elements made of a glass such as an aspherical lens, etc., that require much labor and a high cost when they are produced by grinding and polishing. High-refractivity low-dispersion glasses used in the above precision press-molding method are disclosed in Patent Documents 1 to 3.

PRIOR ART DOCUMENTS

Patent Documents

[Patent Document 1] International Publication No. 2008-050591
[Patent Document 2] JP 2006-137645A
[Patent Document 3] JP 2005-247613A

SUMMARY OF THE INVENTION

Problems to be Solved by the Invention

In the optical glasses disclosed in Patent Documents 1 to 3, rare earth components such as La, etc., advantageous for achieving lower dispersion among high-refractivity-imparting components and components such as Ti, W, etc., more advantageous for achieving higher refractivity are introduced as constituting components for obtaining high-refractivity low-dispersion properties.

Meanwhile, when precision press-molding is carried out using a glass containing rare earth components and high-refractivity-imparting components such as Ti, W, etc., as disclosed in Patent Documents 1 to 3, there is caused a problem that as a pressing operation is repeated, glass is fused to the molding surface of a press mold, that the surface of an optical element molded is fogged to deteriorate a product quality or that the glass is broken.

It is a first object of this invention to overcome the above problems and provide a high-refractivity low-dispersion optical glass that enables the stable production of high-quality optical elements, and it is a second object of this invention to provide a precision press-molding preform and an optical element formed of the above optical glass each and a process for producing the above optical element.

Means to Solve the Problems

For achieving the above objects, this invention provides
(1) an optical glass comprising, by cationic %,
20 to 50% of $B^{3+}$,
0 to 10% of $Si^{4+}$,
5 to 35% of $La^{3+}$,
0 to 10% of $Gd^{3+}$,
0 to 10% of $Y^{3+}$,
0 to 10% of $Yb^{3+}$,
0 to 4% of $Ti^{4+}$,
1 to 30% of $Nb^{5+}$,
0.5 to 15% of $Ta^{5+}$,
0 to 5% of $W^{6+}$,
0 to 10% of $Zr^{4+}$,
11 to 40% of $Zn^{2+}$,
0 to 10% of $Mg^{2+}$,
0 to 10% of $Ca^{2+}$,
0 to 10% of $Sr^{2+}$,
0 to 10% of $Ba^{2+}$,
0 to 10% of $Li^+$,
0 to 10% of $Na^+$,
0 to 10% of $K^+$,
0 to 10% of $Te^{4+}$,
0 to 10% of $Ge^{4+}$,
0 to 10% of $Bi^{3+}$, and
0 to 10% of $Al^{3+}$,
the total content of $B^{3+}$ and $Si^{4+}$ ($B^{3+}+Si^{4+}$) being 20 to 50%,
the total content of $La^{3+}$, $Gd^{3+}$ and $Y^{3+}$ ($La^{3+}+Gd^{3+}+Y^{3+}$) being 5 to 35%,
the cationic ratio of (($B^{3+}+Si^{4+}$)/($La^{3+}+Gd^{3+}+Y^{3+}$)) being from 1 to 5,
the total content of $Ti^{4+}$, $Nb^{5+}$, $Ta^{5+}$ and $W^{6+}$ ($Ti^{4+}+Nb^{5+}+Ta^{5+}+W^{6+}$) being 10 to 35%,
the cationic ratio of (($Nb^{5+}+Ta^{5+}$)/($Ti^{4+}+Nb^{5+}+Ta^{5+}+W^{6+}$)) being from 0.7 to 1,
the cationic ratio of (($B^{3+}+Si^{4+}$)/($Ti^{4+}+Nb^{5+}+Ta^{5+}+W^{6+}$)) being from 0.5 to 4,
the cationic ratio of (($La^{3+}+Gd^{3+}+Y^{3+}$)/($Ti^{4+}+Nb^{5+}+Ta^{5+}+W^{6+}$)) being from 0.2 to 3,
the cationic ratio of the content of $Zn^{2+}$ to the total content of $Zn^{2+}$, $Mg^{2+}$, $Ca^{2+}$, $Sr^{2+}$ and $Ba^{2+}$ ($Zn^{2+}/(Zn^{2+}+Mg^{2+}+Ca^{2+}+Sr^{2+}+Ba^{2+})$) being from 0.8 to 1,
the optical glass having a refractive index nd of 1.89 or more and an Abbe's number vd of 27 to 37,
(2) an optical glass as recited in the above (1), wherein the total content of $Nb^{5+}$ and $Ta^{5+}$ ($Nb^{5+}+Ta^{5+}$) is 5 to 35 cationic %, and the total content of $Ti^{4+}$ and $W^{4+}$ ($Ti^{4+}+W^{4+}$) is 0 to 6 cationic %,
(3) an optical glass as recited in the above (1) or (2), which has a glass transition temperature of 630° C. or lower,
(4) an optical glass as recited in any one of the above (1) to (3), which has a liquidus temperature of 1,200° C. or lower,
(5) an optical glass as recited in any one of the above (1) to (4), which has a partial dispersion ratio Pg,F having a deviation ΔPg,F of 0.006 or less,
(6) a precision press-molding preform formed of the optical glass recited in any one of the above (1) to (5), (7) an optical element formed of the optical glass recited in any one of the above (1) to (5), and (8) a process for producing an optical element, which comprises heating the precision press-molding preform recited in the above (6) and precision press-molding the precision press-molding preform with a press mold.

Effect of the Invention

According to this invention, there can be provided a high-refractivity low-dispersion optical glass that enables the stable production of high-quality optical elements by precision press-molding, etc., there can be provided a precision press-molding preform and an optical element formed of the above optical glass each, and there can be provided a process for producing the above optical element.

PREFERRED EMBODIMENTS OF THE INVENTION

Figure 1:
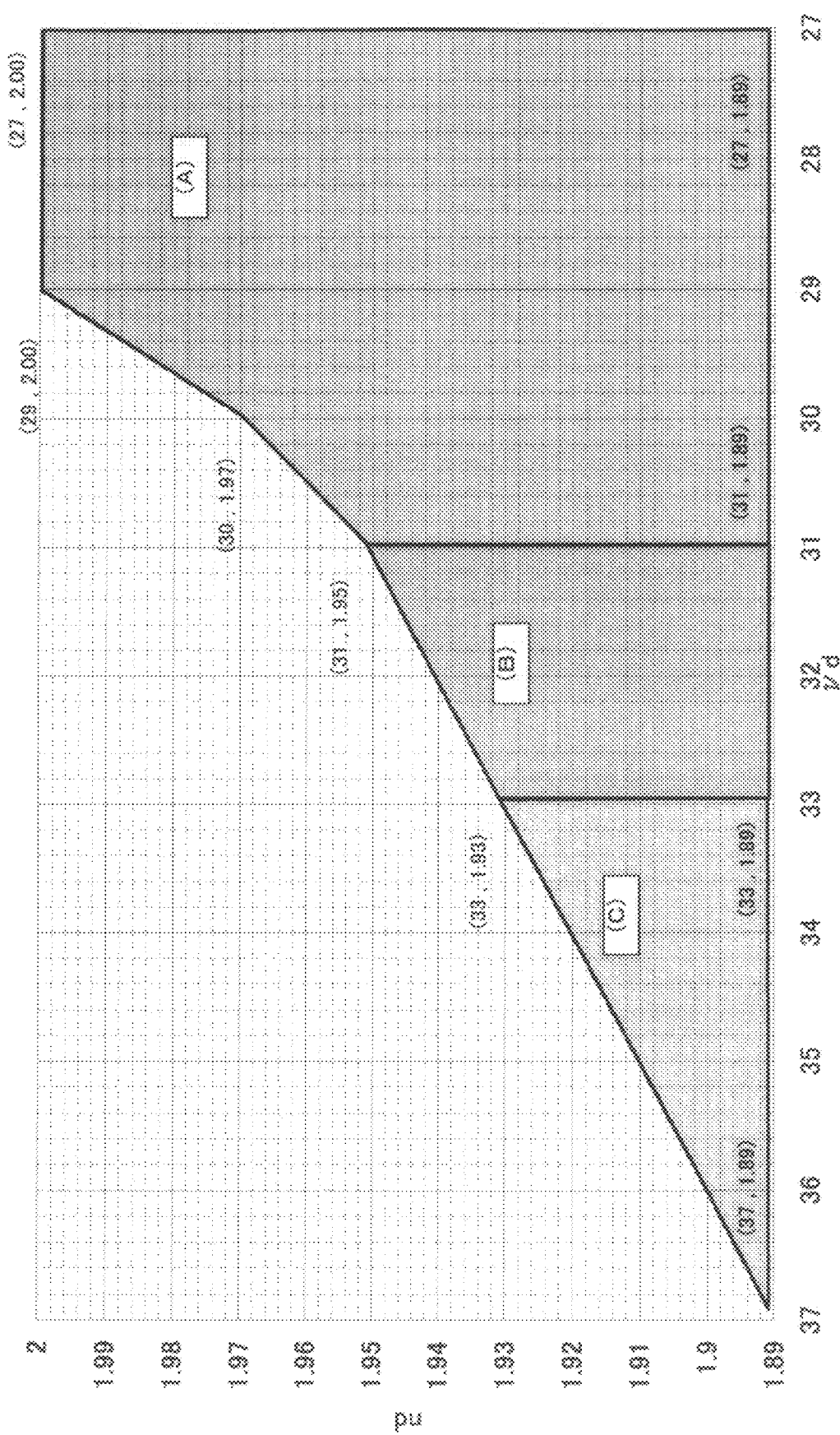
FIG. 1 shows a range of optical properties preferred in the optical glass of this invention by an optical constant chart. A range indicated by A in Figure corresponds to a preferred range in an optical property range A, a range indicated by B corresponds to a preferred range in an optical property range B, and a range indicated by C corresponds to a preferred range in an optical property range C.

The present inventors have made studies of a mechanism that causes a problem that as a pressing operation is repeated, glass is fused to the molding surface of a press mold, that the surface of an optical element molded is fogged to deteriorate a product quality or that the glass is broken.

It is assumed that the above problems are caused by the following phenomena.

For increasing refractivity while maintaining a low-dispersion property, it is required to introduce rare earth components such as La, etc., as glass components. However, when it is intended to attain high refractivity by relying on rare earth components alone, the thermal stability of a glass is greatly decreased, and it is difficult to produce a glass, so that high-refractivity-imparting components such as Ti, Nb, W, etc., are introduced to attain high refractivity.

Of the high-refractivity-imparting components, Ti provides a large increment in refractivity per introduction amount, and is very advantageous for higher refractivity. Further, W out of the high-refractivity-imparting components is an advantageous component for keeping a glass transition temperature from increasing. Therefore, Ti and W have been actively introduced as glass components.

Rare earth components work to increase a glass transition temperature and a sag temperature. Therefore, when it is intended to attain higher refractivity with maintaining a low-dispersion property, a glass transition temperature is increased as compared with a glass of which the rare earth component content can be controlled such that it is small.

On the other hand, Ti and W are liable to cause a change in valence at such high temperatures as in precision press-molding, and when Ti and W in a glass are in intimate contact with a press mold at high temperatures, they are liable to cause a redox reaction with materials, e.g., carbon, etc., that constitute a molding surface of a press mold. The above reaction is more promoted with an increase in press-molding temperature, and when a glass having a glass transition temperature increased by the introduction of rare earth components is precision press-molded, the above reaction is promoted, and as a result, the above problems take place.

In order to inhibit a reaction between a press mold and a glass, it is important to limit the contents of such components as Ti and W, and it is also important to keep a glass transition temperature from increasing. At the same time, it is also important to take it into consideration that the thermal stability of a glass is not impaired.

The optical glass that is accordingly completed is an optical glass comprising, by cationic %, 20 to 50% of $B^{3+}$,
0 to 10% of $Si^{4+}$,
5 to 35% of $La^{3+}$,
0 to 10% of $Gd^{3+}$,
0 to 10% of $Y^{3+}$,
0 to 10% of $Yb^{3+}$,
0 to 4% of $Ti^{4+}$,
1 to 30% of $Nb^{5+}$,
0.5 to 15% of $Ta^{5+}$,
0 to 5% of $W^{6+}$,
0 to 10% of $Zr^{4+}$,
11 to 40% of $Zn^{2+}$,
0 to 10% of $Mg^{2+}$,
0 to 10% of $Ca^{2+}$,
0 to 10% of $Sr^{2+}$,
0 to 10% of $Ba^{2+}$,
0 to 10% of $Li^+$,
0 to 10% of $Na^+$,
0 to 10% of $K^+$,
0 to 10% of $Te^{4+}$,
0 to 10% of $Ge^{4+}$,
0 to 10% of $Bi^{3+}$, and
0 to 10% of $Al^{3+}$,
the total content of $B^{3+}$ and $Si^{4+}$ ($B^{3+}+Si^{4+}$) being 20 to 50%,
the total content of $La^{3+}$, $Gd^{3+}$ and $Y^{3+}$ ($La^{3+}+Gd^{3+}+Y^{3+}$) being 5 to 35%,
the cationic ratio of (($B^{3+}+Si^{4+}$)/($La^{3+}+Gd^{3+}+Y^{3+}$)) being from 1 to 5,
the total content of $Ti^{4+}$, $Nb^{5+}$, $Ta^{5+}$ and $W^{6+}$ ($Ti^{4+}+Nb^{5+}+Ta^{5+}+W^{6+}$) being 10 to 35%,
the cationic ratio of (($Nb^{5+}+Ta^{5+}$)/($Ti^{4+}+Nb^{5+}+Ta^{5+}+W^{6+}$)) being from 0.7 to 1,
the cationic ratio of (($B^{3+}+Si^{4+}$)/($Ti^{4+}+Nb^{5+}+Ta^{5+}+W^{6+}$)) being from 0.5 to 4,
the cationic ratio of (($La^{3+}+Gd^{3+}+Y^{3+}$)/($Ti^{4+}+Nb^{5+}+Ta^{5+}+W^{6+}$)) being from 0.2 to 3,
the cationic ratio of the content of $Zn^{2+}$ to the total content of $Zn^{2+}$, $Mg^{2+}$, $Ca^{2+}$, $Sr^{2+}$ and $Ba^{2+}$ ($Zn^{2+}/(Zn^{2+}+Mg^{2+}+Ca^{2+}+Sr^{2+}+Ba^{2+}$) being from 0.8 to 1,
the optical glass having a refractive index nd of 1.89 or more and an Abbe's number vd of 27 to 37.

The optical glass of this invention will be explained in detail below. Contents and total contents of cationic components by % hereinafter stand for contents or total contents by cationic % unless otherwise specified, and ratios of contents hereinafter stand for cationic ratios of contents.

$B^{3+}$ is a component for forming a glass network, and it is essential for maintaining the thermal stability of a glass and also works to improve meltability. When the content of $B^{3+}$ is less than 20%, it is difficult to produce the above effects, and when it exceeds 50%, the refractivity decreases. The content of $B^{3+}$ is hence limited to the range of 20 to 50%.

$Si^{4+}$ is a component that works to improve the thermal stability of a glass, and is also a component effective for obtaining a viscosity suitable for molding when a glass melt is molded. When the content of $Si^{4+}$ exceeds 10%, the refractivity is decreased, and the glass transition temperature is increased. The content of $Si^{4+}$ is hence limited to the range of 0 to 10%.

Both $B^{3+}$ and $Si^{4+}$ are components for forming a network, and for maintaining the thermal stability of a glass, the total content of $B^{3+}$ and $Si^{4+}$ ($B^{3+}+Si^{4+}$) is adjusted to 20% or more. When the total content of $B^{3+}$ and $Si^{4+}$ exceeds 50%, it is difficult to obtain the predetermined optical properties, so that the total content of $B^{3+}$ and $Si^{4+}$ is limited to the range of 20 to 50%.

$La^{3+}$ is a component that works to increase refractivity while maintaining a low-dispersion property. When the content of $La^{3+}$ is less than 5%, it is difficult to product the above effect, and when it exceeds 35%, the thermal stability of a glass is decreased, and the glass transition temperature shows a tendency to increase. The content of $La^{3+}$ is hence limited to the range of 5 to 35%.

All of $Gd^{3+}$, $Y^{3+}$ and $Yb^{3+}$ are components that increase refractivity while maintaining a low-dispersion property. When the content of any one of $Gd^{3+}$, $Y^{3+}$ and $Yb^{3+}$ exceeds 10%, the thermal stability of a glass is decreased, and the glass transition temperature shows a tendency to increase. The content of any one of $Gd^{3+}$, $Y^{3+}$ and $Yb^{3+}$ is hence limited to the range of 0 to 10%. The content of any one of $Gd^{3+}$, $Y^{3+}$ and $Yb^{3+}$ is preferably in the range of 0 to 6%, more preferably in the range of 0 to 3%, still more preferably in the range of 0 to 2%, yet more preferably in the range of 0 to 1%, and it is further more preferred to incorporate none of these components.

For maintaining a low-dispersion property and increasing refractivity, the total content of $La^{3+}$, $Gd^{3+}$ and $Y^{3+}$ ($La^{3+}+Gd^{3+}+Y^{3+}$) is adjusted to 5% or more. When the total content of $La^{3+}$, $Gd^{3+}$ and $Y^{3+}$ exceeds 35%, the thermal stability of a glass is decreased, and the glass transition temperature shows a tendency to increase. The total content of $La^{3+}$, $Gd^{3+}$ and $Y^{3+}$ is hence limited to the range of 5 to 35%.

Further, when the cationic ratio of $((B^{3+}+Si^{4+})/(La^{3+}+Gd^{3+}+Y^{3+}))$ is less than 1, the thermal stability of a glass is decreased. When it exceeds 5, it is difficult to maintain the predetermined optical properties. The cationic ratio of $((B^{3+}+Si^{4+})/(La^{3+}+Gd^{3+}+Y^{3+}))$ is hence adjusted in the range of 1 to 5.

$Ti^{4+}$ is a component that works to increase refractivity. When the content of $Ti^{4+}$ exceeds 4%, precision press-moldability is decreased, and a glass shows a tendency to be colored. The content of $Ti^{4+}$ is hence limited to the range of 0 to 4%.

$Nb^{5+}$ is an essential component that works to increase refractivity and that also works to improve the thermal stability of a glass by being co-present as a glass component together with $La^{3+}$. Further, $Nb^{5+}$, as well as $Ta^{5+}$, causes a redox reaction with a press mold relatively to a less degree among those components which highly work to increase refractivity such as $Ti^{4+}$, $Ta^{5+}$ and $W^{6+}$, and it is also a component that causes to a less degree failures such as fusion of a glass to a press mold, fogging of a glass surface, scratches, etc. When the content of $Nb^{5+}$ is less than 1%, it is difficult to produce the above effects. When it exceeds 30%, the thermal stability of a glass is decreased, and the liquidus temperature shows a tendency to increase. The content of $Nb^{5+}$ is hence limited to the range of 1 to 30%.

$Ta^{5+}$ is not only a component that works to increase refractivity, but also a component that causes a redox reaction with a press mold to a less degree like $Nb^{5+}$ than $Ti^{4+}$ and $W^{6+}$. The content of $Ta^{5+}$ is adjusted to 0.5% or more for obtaining a high-refractivity glass excellent in precision press-moldability. When the content of $Ta^{5+}$ exceeds 15%, however, the thermal stability of a glass shows a tendency to decrease. The content of $Ta^{5+}$ is hence limited to the range of 0.5 to 15%.

$W^{6+}$ is a component that increases refractivity and increases the thermal stability of a glass and that also works to decrease the liquidus temperature. When the content of $W^{6+}$ exceeds 5%, the precision press-moldability is decreased, and the glass shows a tendency to be colored. The content of $W^{6+}$ is hence limited to the range of 0 to 5%.

When the total content of $Ti^{4+}$, $Nb^{5+}$, $Ta^{5+}$ and $W^{6+}$ ($Ti^{4+}+Nb^{5+}+Ta^{5+}+W^{6+}$) is less than 10% or over 35%, it is difficult to maintain the predetermined optical properties and thermal stability of a glass. The total content of $Ti^{4+}$, $Nb^{5+}$, $Ta^{5+}$ and $W^{6+}$ is hence limited to the range of 10 to 35%.

As described above, $Nb^{5+}$ and $Ta^{5+}$ among $Ti^{4+}$, $Nb^{5+}$, $Ta^{5+}$ and $W^{6+}$ are components that deteriorate precision press-moldability to a less degree, so that the cationic ratio of $((Nb^{5+}+Ta^{5+})/(Ti^{4+}+Nb^{5+}+Ta^{5+}+W^{6+}))$ is limited to the range of 0.7 to 1 for preventing the deterioration of precision press-moldability.

For the same reason as the above, preferably, the total content of $Nb^{5+}$ and $Ta^{5+}$ ($Nb^{5+}$ and $Ta^{5+}$) is adjusted to the range of 5 to 35%, and the total content of $Ti^{4+}$ and $W^{6+}$ ($Ti^{4+}+W^{6+}$) is adjusted to the range of 0 to 6%.

Further, for maintaining the thermal stability of a glass and at the same time materializing the predetermined optical properties, the cationic ratio of $((B^{3+}+Si^{4+})/(Ti^{4+}+Nb^{5+}+Ta^{5+}+W^{6+}))$ is adjusted to the range of 0.5 to 4, and the cationic ratio of $((La^{3+}+Gd^{3+}+Y^{3+})/(Ti^{4+}+Nb^{5+}+Ta^{5+}+W^{6+}))$ is adjusted to the range of 0.2 to 3.

$Zr^{4+}$ is a component that works to increase refractivity. When the content of $Zr^{4+}$ exceeds 10%, the thermal stability of a glass is decreased, and the liquidus temperature shows a tendency to increase. The content of $Zr^{4+}$ is hence limited to the range of 0 to 10%.

$Zn^{2+}$ is a component that works to decrease glass transition temperature while maintaining high refractivity, and that also works to improve meltability. When the content of $Zn^{2+}$ is less than 11%, it is difficult to produce the above effects, and when it exceeds 40%, the thermal stability of a glass shows a tendency to decrease. The content of $Zn^{2+}$ is hence limited to the range of 11 to 40%.

All of $Mg^{2+}$, $Ca^{2+}$, $Sr^{2+}$ and $Ba^{2+}$ work to improve meltability. When the content of any one of them exceeds 10%, the refractivity is decreased, and the thermal stability of a glass shows a tendency to decrease. The content of any one of $Mg^{2+}$, $Ca^{2+}$, $Sr^{2+}$ and $Ba^{2+}$ is limited to the range of 0 to 10%. The content of any one of $Mg^{2+}$, $Ca^{2+}$, $Sr^{2+}$ and $Ba^{2+}$ is preferably in the range of 0 to 6%, more preferably in the range of 0 to 3%, still more preferably in the range of 0 to 2%, yet more preferably in the range of 0 to 1%, and further more preferably, none of these components is contained.

Among $Zn^{2+}$, $Mg^{2+}$, $Ca^{2+}$, $Sr^{2+}$ and $Ba^{2+}$ that are divalent metal components, $Zn^{2+}$ is a component that is excellent in working to decrease glass transition temperature while maintaining high refractivity, so that the cationic ratio of the content of $Zn^{2+}$ to the total content of $Zn^{2+}$, $Mg^{2+}$, $Ca^{2+}$, $Sr^{2+}$ and $Ba^{2+}$ ($Zn^{2+}/Zn^{2+}+Mg^{2+}+Ca^{2+}+Sr^{2+}+Ba^{2+}$) is adjusted to the range of 0.8 to 1.

$Li^+$ is a component that improves meltability and works to decrease glass transition temperature to a great extent and that also works to improve the thermal stability of a glass when introduced in a small amount. Further, of alkali metal components, $Li^+$ is the most advantageous component for maintaining high refractivity. When the content of $Li^+$ exceeds 10%, however, the refractive index is decreased, and the thermal stability of a glass also shows a tendency to decrease. The content of $Li^+$ is hence limited to the range of 0 to 10%. The content of $Li^+$ is preferably in the range of 0 to 6%, more preferably in the range of 0 to 3%, still more preferably in the range of 0 to 2%, yet more preferably in the range of 0 to 1%, and further more preferably, it is not contained.

Both $Na^+$ and $K^+$ improve meltability and work to decrease glass transition temperature. When the content of any one of $Na^+$ and $K^+$ exceeds 10%, the refractivity is decreased, and the thermal stability of a glass shows a tendency to decrease. The content of any one of $Na^+$ and $K^+$ is hence limited to the range of 0 to 10%. The content of any one of $Na^+$ and $K^+$ is preferably in the range of 0 to 6%, more preferably in the range of 0 to 3%, still more preferably in the range of 0 to 2%, yet more preferably 0 to 1%, and further more preferably, none of these components is contained.

$Li^+$ is excellent over $Na^+$ and $K^+$ in maintaining high refractivity and working to decrease glass transition temperature, so that $Li^+$ is incorporated more than any component of $Na^+$ and $K^+$.

$Te^{4+}$ is a component that increases refractivity and works to improve the thermal stability of a glass. When the content of $Te^{4+}$ exceeds 10%, the thermal stability of a glass is decreased. The content of $Te^{4+}$ is hence limited to the range of 0 to 10%. From the viewpoint of taking an environmental burden into consideration, it is desirable to decrease the amount of $Te^{4+}$ that is used. From the above viewpoint, the content of $Te^{4+}$ is preferably in the range of 0 to 6%, more preferably in the range of 0 to 3%, still more preferably 0 to 2%, yet more preferably in the range of 0 to 1%, and further more preferably, it is not contained.

$Ge^{4+}$ is a component that increases refractivity and that also works to increase the thermal stability of a glass. When the content of $Ge^{4+}$ exceeds 10%, the thermal stability of a glass is decreased. The content of $Ge^{4+}$ is hence limited to the range of 0 to 10%. $Ge^{4+}$ is an extraordinarily expensive component among substances used as glass components, and when it is taken into account that an increase in production cost is reduced, it is desirable to decrease the use amount thereof. The content thereof is preferably in the range of 0 to 6%, more preferably in the range of 0 to 3%, still more preferably in the range of 0 to 2%, yet more preferably in the range of 0 to 1%, and further more preferably, it is not contained.

$Bi^{3+}$ is a component that increases refractivity and that also works to increase the thermal stability of a glass. When the content of $Bi^{3+}$ exceeds 10%, the thermal stability of a glass is decreased, and the glass shows a tendency to be colored. The content of $Bi^{3+}$ is hence limited to the range of 0 to 10%. The content of $Bi^{3+}$ is preferably in the range of 0 to 6%, more preferably in the range of 0 to 3%, still more preferably in the range of 0 to 1%, and yet more preferably, it is not contained.

$Al^{3+}$ is a component that works to improve the thermal stability and chemical durability of a glass. When the content of $Al^{3+}$ exceeds 10%, the refractivity is decreased, and the thermal stability of a glass shows a tendency to decrease. The content of $Al^{3+}$ is hence limited to the range of 0 to 10%. The content of $Al^{3+}$ is preferably in the range of 0 to 6%, more preferably in the range of 0 to 3%, still more preferably in the range of 0 to 1%, and yet more preferably, it is not contained.

The optical glass of this invention has $O^{2-}$ as a main anion component and in principle is an oxide glass. As anion components other than $O^{2-}$, halogen components such as $F^-$, $Cl^-$, etc., can be introduced in a small amount. When it is considered important to suppress the volatility of a molten glass and make molding easier, it is desirable to control the amount of a volatile $F^-$ component that is introduced, that is, it is desirable to introduce no $F^-$ component. Not as a glass component but as a clarifier, a very small amount of halogens such as F and Cl can be added to melt a glass.

As a clarifier, $Sb_2O_3$, carbonate, sulfate, nitrate, etc., may be added in a small amount. When $Sb_2O_3$ is added, Sb has high oxidizing power, and hence in order to hold it from promoting a redox reaction with the molding surface of a press mold, the amount of $Sb_2O_3$ based on a glass composition excluding $Sb_2O_3$ is preferably adjusted to the range of 0 to 1 mass %, more preferably, to the range of 0 to 0.5 mass %.

Since Fe, Cr, Co and Cu color a glass, it is desirable to add none of these.

Further, it is desirable to introduce none of Pb, Cd, Tl, As, etc., which may cause an adverse effect on the environment.

Lu and Ga may be introduced in a small amount so long as the object of this invention is not impaired. However, these components are very expensive, and the object of this invention can be achieved without using them, so that it is desirable to introduce none of Lu and Ga into a glass in order to keep a cost from increasing.

For achieving more preferred thermal stability of a glass decreasing glass transition temperature and rendering precision press-moldability more suitable while maintaining the predetermined optical properties in the above composition ranges, the total content of $B^{3+}$, $Si^{4+}$, $La^{3+}$, $Gd^{3+}$, $Y^{3+}$, $Yb^{3+}$, $Ti^{4+}$, $Nb^{5+}$, $Ta^{5+}$, $W^{6+}$, $Zr^{4+}$, $Zn^{2+}$, $Mg^{2+}$, $Ca^{2+}$, $Sr^{2+}$, $Ba^{2+}$, $Li^+$, $Na^+$ and $K^+$ is preferably adjusted to 95% or more, more preferably, to 98% or more, still more preferably, to 99% or more, yet more preferably 99.5% or more, further more preferably, to 100%.

Further, the total content of $B^{3+}$, $Si^{4+}$, $La^{3+}$, $Gd^{3+}$, $Y^{3+}$, $Yb^{3+}$, $Ti^{4+}$, $Nb^{5+}$, $Ta^{5+}$, $W^{6+}$, $Zr^{4+}$, $Zn^{2+}$ and $Li^+$ is preferably adjusted to 95% or more, more preferably, to 98% or more, still more preferably, to 99% or more, yet more preferably 99.5% or more, further more preferably, to 100%.

Further, the total content of $B^{3+}$, $Si^{4+}$, $La^{3+}$, $Gd^{3+}$, $Y^{3+}$, $Yb^{3+}$, $Ti^{4+}$, $Nb^{5+}$, $Ta^{5+}$, $W^{6+}$, $Zr^{4+}$ and $Zn^{2+}$ is preferably adjusted to 95% or more, more preferably, to 98% or more, still more preferably, to 99% or more, yet more preferably 99.5% or more, further more preferably, to 100%.

[Refractivity•Dispersion]

The optical glass of this invention has a refractive index nd of 1.89 or more and an Abbe's number vd of 27 to 37. Owing to a refractive index nd of 1.89 or more, when the optical glass of this invention is used, the optical system of an image-sensing optical system or a projector optical system such as a projector can be downsized. Further, the zoom factor of an optical system can be also increased. Owing to a high refractivity, further, the absolute value of curvature of optical function surface of a lens for obtaining predetermined light-gathering power can be decreased. Since the absolute value of curvature of an optical function surface can be decreased, it is made easier to process the molding surface of a press mold that is used for precision press-molding. There can be decreased a trouble of ambient gas being confined between a glass and a press mold during precision press-molding (generally called "gas trap") so that the transfer accuracy of a mold is decreased. When the optical function surface is ground and polished, it is made easier to grind and polish it. Further, since the absolute value of an optical function surface can be decreased, the effective diameter of a lens can be increased.

Further, since the optical glass of this invention has an Abbe's number vd of 27 or more while it is a high-refractivity glass, it is effective as a lens material capable of performing excellent chromatic aberration correction when combined with a lens formed of a high-refractivity high-dispersion glass.

Further, since the content of components that impart high-refractivity high-dispersion properties such as $Ti^{4+}$, $Nb^{5+}$ and $W^{6+}$ can be limited when the Abbe's number vd is adjusted to 27 or more, indirectly, the precision press-moldability of a glass can be improved.

On the other hand, when the Abbe's number vd exceeds 37 while a refractive index nd of 1.89 or more is maintained, the thermal stability of a glass is decreased or the glass transition temperature is increased. When the glass transition temperature is increased, it is required to set a precision press-molding temperature high, a redox reaction between a glass and a press mold is hence promoted, the trouble of a glass being fused to a press mold or a glass surface being fogged is liable to take place, and the precision press-moldability is decreased.

For the above reasons, it is determined that the optical glass of this invention has a refractive index nd of 1.89 or more and an Abbe's number vd of 27 to 37.

When the refractivity of a high-refractivity low-dispersion glass is increased while the low-dispersion property is maintained, the thermal stability of the glass is decreased, or the glass transition temperature shows a tendency to increase. When a higher refractivity is to be achieved with permitting higher dispersion, a decrease in thermal stability and an increase in glass transition temperature can be reduced.

For maintaining thermal stability and maintaining a glass transition temperature low, therefore, the preferred optical property range of the optical glass of this invention is defined either by limiting the upper limit of the refractive index or by limiting the upper limit of the refractive index depending upon the Abbe's number (or limiting the upper limit of the Abbe's number depending upon the refractive index).

In a high-refractivity low-dispersion glass like the optical glass of this invention, it is preferred to impart the glass with higher refractivity and lower dispersion for enhancing the above chromatic aberration correcting function. From this point of view, the preferred optical property range of the optical glass of this invention is defined by limiting the lower limit of the refractive index or limiting the lower limit of the refractive index depending upon the Abbe's number (or limiting the lower limit of the Abbe's number depending upon the refractive index).

In the optical glass of this invention, the preferred optical property range is largely classified into the following three ranges, i.e., optical property ranges A to C. These preferred ranges are determined from the viewpoint of refractive index, Abbe's number, thermal stability of a glass, glass transition temperature and optical functions such as chromatic aberration correcting function, etc.

An optical constant chart is widely used by way of a method of showing optical properties of an optical glass. In an optical constant chart, an abscissa axis indicates Abbe's number vd, and an ordinate axis indicates refractive index nd. In the abscissa axis, a rightward direction is a direction in which the Abbe's number decreases (high dispersion direction), and a leftward direction is a direction in which the Abbe's number increases (low dispersion direction). In the ordinate axis, an upward direction is a direction in which the refractivity increases, and a downward direction is a direction in which the refractivity decreases. The scales of the abscissa axis and the ordinate axis are linear scales. The optical properties of a specific optical glass are indicated as one dot on the optical constant chart.

Figure 2:
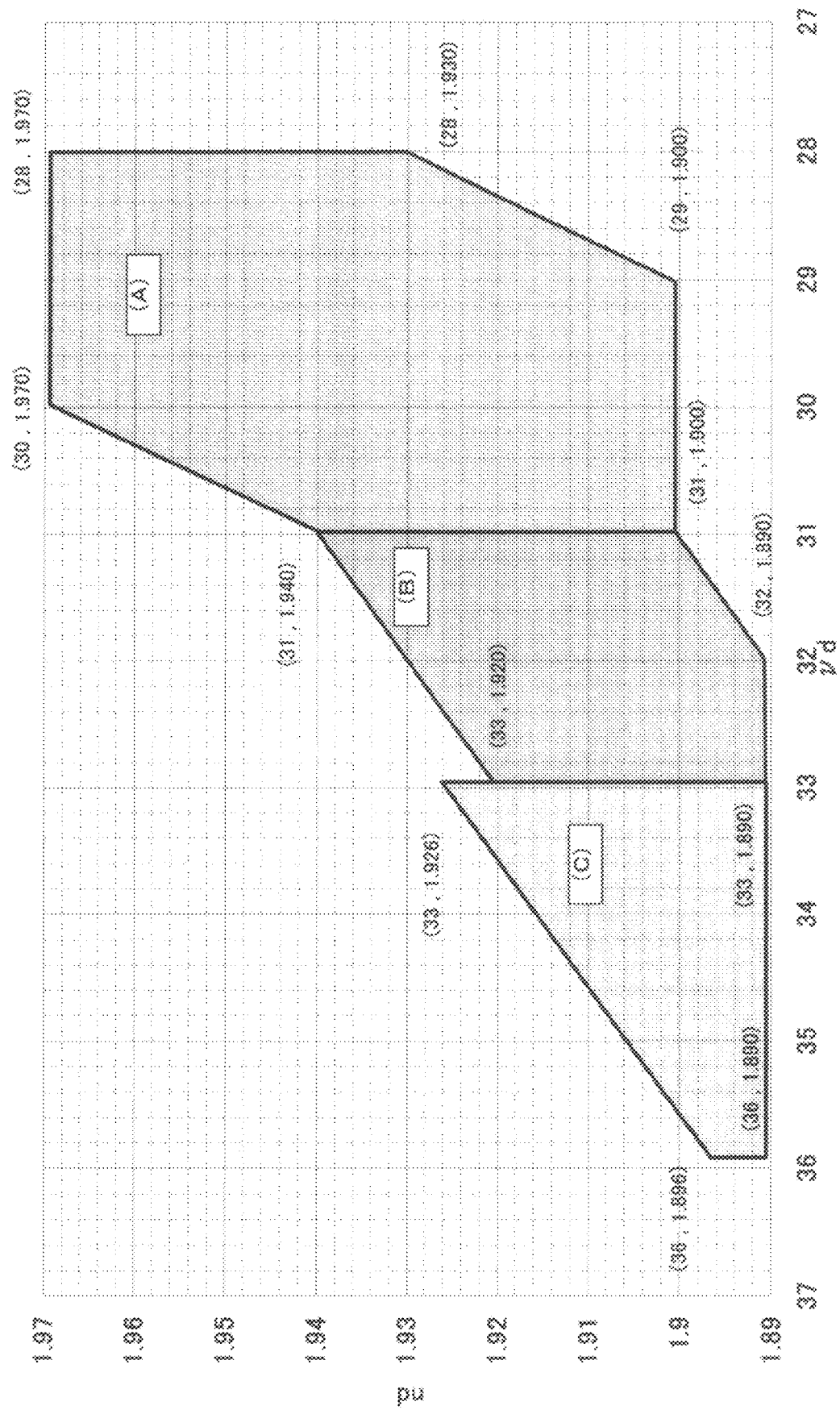
FIG. 2 shows a range of optical properties more preferred in the optical glass of this invention by an optical constant chart. A range indicated by A in Figure corresponds to a more preferred range in an optical property range A, a range indicated by B corresponds to a more preferred range in an optical property range B, and a range indicated by C corresponds to a more preferred range in an optical property range C.
Figure 3:
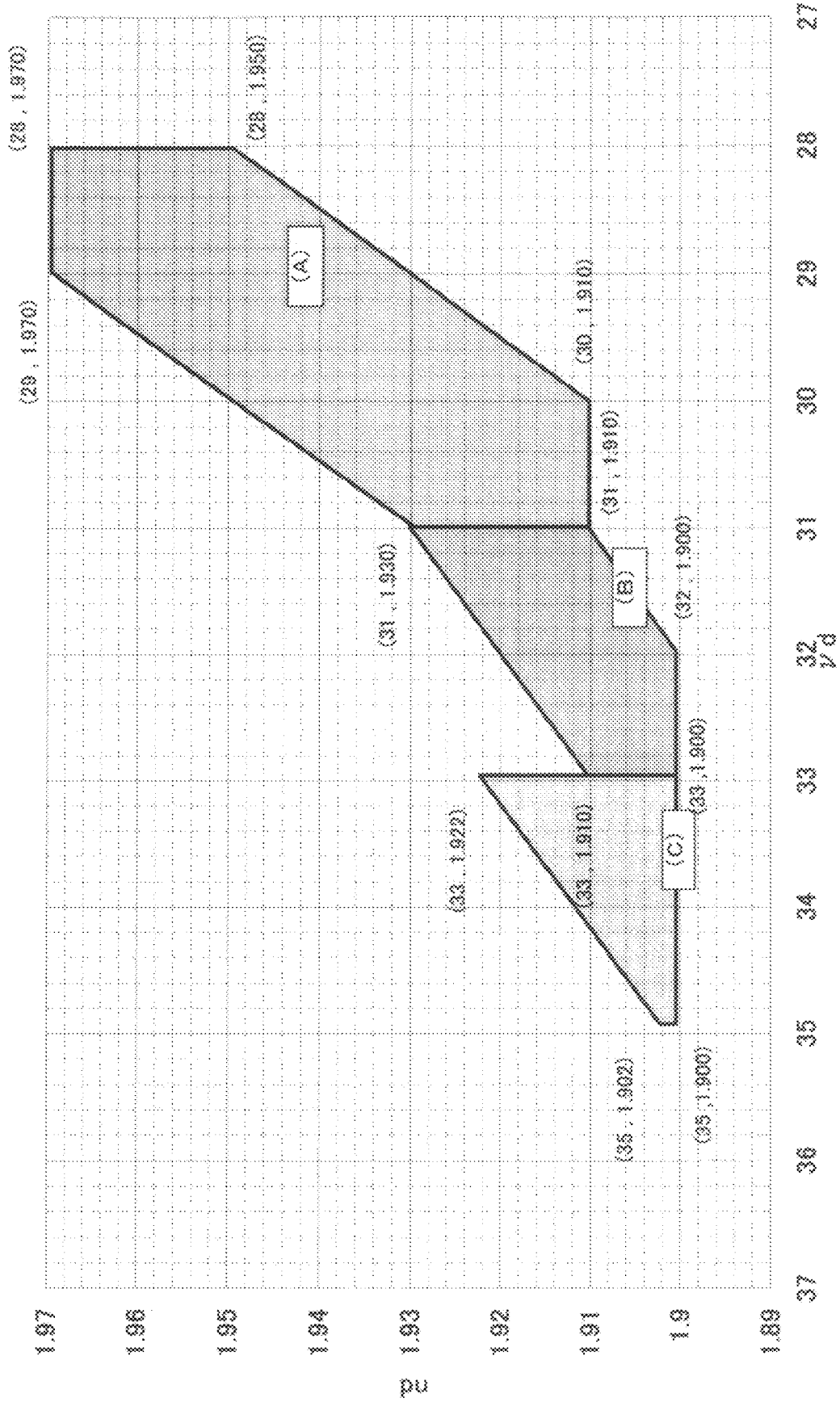
FIG. 3 shows a range of optical properties still more preferred in the optical glass of this invention by an optical constant chart. A range indicated by A in Figure corresponds to a still more preferred range in an optical property range A, a range indicated by B corresponds to a still more preferred range in an optical property range B, and a range indicated by C corresponds to a still more preferred range in an optical property range C.

FIGS. 1 to 3 show preferred optical property ranges of the optical glass of this invention on optical property charts.

[Optical Property Range A]

An optical property range A is a range in which the refractive index nd is 1.89 or more and the Abbe's number vd is 27 or more but less than 31.

In the optical constant chart shown in FIG. 1, a dot of coordinates (27, 1.89) is taken as a1, a dot of coordinates (27, 2.00) is taken as a2, a dot of coordinates (29, 2.00) is taken as a3, a dot of coordinates (30, 1.97) is taken as a4, a dot of coordinates (31, 1.95) is taken as a5, and a dot of coordinates (31, 1.89) is taken as a6. In this case, a range combining a range surrounded by straight lines formed by connecting the above dots in the order of a1→a2→a3→a4→a5→a6→a1 and the above straight lines (excluding the straight line connecting a5 and a6) is a preferred range in the optical property range A.

In the optical constant chart shown in FIG. 2, a dot of coordinates (28, 1.930) is taken as a7, a dot of coordinates (28, 1.970) is taken as a8, a dot of coordinates (30, 1.970) is taken as a9, a dot of coordinates (31, 1.940) is taken as a10, a dot of coordinates (31, 1.900) is taken as a11, and a dot of coordinates (29, 1.900) is taken as a12. In this case, a range combining a range surrounded by straight lines formed by connecting the above dots in the order of a7→a8→a9→a10→a11→a12→a7 and the above straight lines (excluding the straight line connecting a10 and a11) is a more preferred range in the optical property range A.

In the optical constant chart shown in FIG. 3, a dot of coordinates (28, 1.950) is taken as a13, a dot of coordinates (28, 1.970) is taken as a14, a dot of coordinates (29, 1.970) is taken as a15, a dot of coordinates (31, 1.930) is taken as a16, a dot of coordinates (31, 1.910) is taken as a17, and a dot of coordinates (30, 1.910) is taken as a18. In this case, a range combining a range surrounded by straight lines formed by connecting the above dots in the order of a13→a14→a15→a16→a17→a18→a13 and the above straight lines (excluding the straight line connecting a16 and a17) is a still more preferred range in the optical property range A.

[Optical Property Range B]

An optical property range B is a range in which the refractive index nd is 1.89 or more and the Abbe's number vd is 31 to 33.

In the optical constant chart shown in FIG. 1, a dot of coordinates (31, 1.89) is taken as b1, a dot of coordinates (31, 1.95) is taken as b2, a dot of coordinates (33, 1.93) is taken as b3, and a dot of coordinates (33, 1.89) is taken as b4. In this case, a range combining a range surrounded by straight lines formed by connecting the above dots in the order of b1→b2→b3→b4→b1 and the above straight lines is a preferred range in the optical property range B.

In the optical constant chart shown in FIG. 2, a dot of coordinates (31, 1.900) is taken as b5, a dot of coordinates (31, 1.940) is taken as b6, a dot of coordinates (33, 1.920) is taken as b7, a dot of coordinates (33, 1.890) is taken as b8, and a dot of coordinates (32, 1.890) is taken as b9. In this case, a range combining a range surrounded by straight lines formed by connecting the above dots in the order of b5→b6→b7→b8→b9→b5 and the above straight lines is a more preferred range in the optical property range B.

In the optical constant chart shown in FIG. 3, a dot of coordinates (31, 1.910) is taken as b10, a dot of coordinates (31, 1.930) is taken as b11, a dot of coordinates (33, 1.910) is taken as b12, a dot of coordinates (33, 1.900) is taken as b13, and a dot of coordinates (32, 1.900) is taken as b14. In this case, a range combining a range surrounded by straight lines formed by connecting the above dots in the order of b10→b11→b12→b13→b14→b10 and the above straight lines is a still more preferred range in the optical property range B.

[Optical Property Range C]

An optical property range C is a range in which the refractive index nd is 1.89 or more and the Abbe's number vd is over 33 but not more than 37.

In the optical constant chart shown in FIG. 1, a dot of coordinates (33, 1.89) is taken as c1, a dot of coordinates (33, 1.93) is taken as c2, and a dot of coordinates (37, 1.89) is taken as c3. In this case, a range combining a range surrounded by straight lines formed by connecting the above dots in the order of c1→c2→c3→c1 and the above straight lines (excluding a straight connecting c1 and c2) is a preferred range in the optical property range C.

In the optical constant chart shown in FIG. 2, a dot of coordinates (33, 1.890) is taken as c4, a dot of coordinates (33, 1.926) is taken as c5, a dot of coordinates (36, 1.896) is taken as c6, and a dot of coordinates (36, 1.890) is taken as c7. In this case, a range combining a range surrounded by straight lines formed by connecting the above dots in the order of c4→c5→c6→c7→c4 and the above straight lines (excluding a straight connecting c4 and c5) is a more preferred range in the optical property range C.

In the optical constant chart shown in FIG. 3, a dot of coordinates (33, 1.900) is taken as c8, a dot of coordinates (33, 1.922) is taken as c9, a dot of coordinates (35, 1.902) is taken as c10, and a dot of coordinates (35, 1.900) is taken as c11. In this case, a range combining a range surrounded by straight lines formed by connecting the above dots in the order of c8→c9→c10→c11→c8 and the above straight lines (excluding a straight connecting c8 and c9) is a still more preferred range in the optical property range C.

The optical property ranges shown in the optical constant charts in FIGS. 1, 2 and 3 are those shown by selecting expressions shown in Table 1 (optical property range A), Table 2 (optical property range B) and Table 3 (optical property range C). When level numbers indicating the upper and lower limits of refractive indices and the upper and lower limits of Abbe's numbers shown in Tables 1, 2 and 3 are selected as required, an optical property chart of any combinations can be prepared.

TABLE 1

○ Optical property range A (With an increase in level numbers of refractive index nd and Abbe's number vd, more preferred ranges are shown).

| | Abbe's number vd | | | |
|---|---|---|---|---|
| | 27~<28 | 28~<29 | 29~<30 | 30~<31 |
| Lower limit of refractive index nd | | | | |
| (Level 1) | nd ≥ 1.89 | nd ≥ 1.89 | nd ≥ 1.89 | nd ≥ 1.89 |
| (Level 2) | nd ≥ −0.03 vd + 2.748 | nd ≥ 1.89(vd ≥ 28.6)<br>nd ≥ −0.03 vd + 2.748<br>(vd < 28.6) | | |
| (Level 3) | nd ≥ −0.03 vd + 2.770 | nd ≥ −0.03 vd + 2.770 | nd ≥ 1.90 | nd ≥ 1.90 |
| (Level 4) | | | nd ≥ −0.02 vd + 2.500 | nd ≥ −0.02 vd + 2.510<br>(vd ≤ 30.5)<br>nd ≥ 1.900(vd > 30.5) |
| (Level 5) | nd ≥ −0.02 vd + 2.500 | nd ≥ −0.02 vd + 2.500 | | |
| (Level 6) | nd ≥ −0.02 vd + 2.510 | nd ≥ −0.02 vd + 2.510 | nd ≥ −0.02 vd + 2.510 | nd ≥ 1.910 |
| (Level 7) | | | | |
| (Level 8) | | | | |
| Upper limit of refractive index nd | | | | |
| (Level 1) | nd ≤ 2.00 | nd ≤ 2.00 | nd ≤ −0.03 vd + 2.870 | nd ≤ −0.02 vd + 2.570 |
| (Level 2) | nd ≤ 1.98 | nd ≤ 1.98 | nd ≤ 1.98(vd ≤ 29.4)<br>nd ≤ −0.02 vd + 2.568<br>(29.4 < vd ≤ 29.9)<br>vd ≤ 1.97(vd > 29.9) | nd ≤ −0.03 vd + 2.870<br>(vd ≤ 30.2)<br>nd ≤ −0.02 vd + 2.568<br>(vd > 30.2) |
| (Level 3) | nd ≤ 1.97 | nd ≤ 1.97 | nd ≤ 1.97 | nd ≥ −0.03 vd + 2.870 |
| (Level 4) | nd ≤ 1.97 | nd ≤ 1.97 | vd ≤ 1.97(vd ≤ 29.9)<br>nd ≤ −0.02 vd + 2.568<br>(vd > 29.9) | nd ≤ −0.02 vd + 2.568<br>(vd ≤ 30.2)<br>nd ≤ −0.03 vd + 2.870<br>(vd > 30.2) |
| (Level 5) | | | | |
| (Level 6) | nd ≤ 1.97 | nd ≤ 1.97 | nd ≤ −0.02 vd + 2.550 | nd ≤ −0.02 vd + 2.550 |

The lower limit of Abbe's number vd: (Level 1) 27 or more, (Level 2) 27.5 or more, (Level 3) 28.0 or more, (level 7) 28.2 or more
The upper limit of Abbe's number vd: (Level 1) less than 31, (Level 7) 30.8 or less, (Level 8) 30.6 or less

TABLE 2

Optical property range B (With an increase in level numbers of refractive index nd and Abbe's number vd, more preferred ranges are shown).

| | Abbe's number vd | |
|---|---|---|
| | 31~32 | 32~33 |
| Lower limit of refractive index nd | | |
| (Level 1) | nd ≥ 1.89 | nd ≥ 1.89 |
| (Level 2) | | |
| (Level 3) | nd ≥ −0.01 vd + 2.210 | nd ≥ 1.89 |
| (Level 4) | nd ≥ 1.9 | nd ≥ 1.89(vd > 32.5) |
| | | nd ≥ −0.01 vd + 2.215(vd ≤ 32.5) |
| (Level 5) | nd ≥ 1.9(vd ≤ 31.5) | |
| | nd ≥ −0.01 vd + 2.215(vd > 31.5) | |
| (Level 6) | nd ≥ −0.01 vd + 2.220 | nd ≥ 1.9 |
| Upper limit of refractive index nd | | |
| (Level 1) | nd ≤ −0.01 vd + 2.260 | nd ≤ −0.01 vd + 2.260 |
| (Level 2) | | |
| (Level 3) | nd ≤ −0.01 vd + 2.250 | nd ≤ −0.01 vd + 2.250 |
| (Level 4) | | |
| (Level 5) | | |
| (Level 6) | nd ≤ −0.01 vd + 2.240 | nd ≤ −0.01 vd + 2.240 |

The lower limit of Abbe's number vd: (Level 1) 31 or more, (Level 7) 31.2 or more, (Level 8) 31.4 or more, (level 9) 31.6 or more
The upper limit of Abbe's number vd: (Level 1) 33 or less, (Level 7) 32.8 or less, (Level 8) 32.6 or less, (Level 9) 32.4 or less

TABLE 3

Optical property range C (With an increase in level numbers of refractive index nd and Abbe's number vd, more preferred ranges are shown).

| | Abbe's number vd = 33<~37 |
|---|---|
| Lower limit of refractive index nd | |
| (Level 1) | nd ≥ 1.89 |
| (Level 2) | |
| (Level 3) | nd ≥ 1.89 |
| (Level 4) | nd ≥ 1.893 |
| (Level 5) | nd ≥ 1.896 |
| (Level 6) | nd ≥ 1.90 |
| Upper limit of refractive index nd | |
| (Level 1) | nd ≤ 2.26 − 0.01 vd |
| (Level 2) | |
| (Level 3) | nd ≤ 2.256 − 0.01 vd |
| (Level 4) | |
| (Level 5) | |
| (Level 6) | nd ≤ 2.252 − 0.01 vd |

Abbe's number vd: (Level 1) over 33 but not more than 37, (Level 3) over 33 but not more than 36, (Level 4) over 33 but not more than 35.5, (level 6) over 33 but not more than 35

Preferred glass composition ranges in each of the optical property ranges A to C will be explained below.

[Preferred Glass Composition in Optical Property Range A]

In the compositional range of the optical glass of this invention, preferred compositional ranges having the optical property range A will be described below.

The content of $B^{3+}$ is preferably in the range of 22 to 48%, more preferably in the range of 24 to 46%, still more preferably in the range of 26 to 44%, yet more preferably in the range of 28 to 42%.

The content of $Si^{4+}$ is preferably in the range of 1 to 8%, more preferably in the range of 1 to 7%, still more preferably in the range of 1 to 6%.

The content of $La^{3+}$ is preferably in the range of 6 to 30%, more preferably in the range of 8 to 26%, still more preferably in the range of 10 to 23%, yet more preferably in the range of 12 to 18%.

The content of $Ti^{4+}$ is preferably in the range of 0 to 3.5%, more preferably in the range of 0 to 3%, still more preferably in the range of 0.5 to 2.5%.

The content of $Nb^{5+}$ is preferably in the range of 5 to 30%, more preferably in the range of 7 to 29%, still more preferably in the range of 8 to 26%, yet more preferably in the range of 9 to 23%.

The content of $Ta^{5+}$ is preferably in the range of 1 to 13%, more preferably in the range of 2 to 10%, still more preferably in the range of 2 to 8%, yet more preferably in the range of 2 to 5%.

The content of $W^{6+}$ is preferably in the range of 0 to 4%, more preferably in the range of 0 to 3.5%, still more preferably in the range of 0 to 3%.

The content of $Zr^{4+}$ is preferably in the range of 1 to 8%, more preferably in the range of 1 to 5%, still more preferably in the range of 1 to 3%.

The content of $Zn^{2+}$ is preferably in the range of 12 to 38%, more preferably in the range of 13 to 35%, still more preferably in the range of 14 to 30%, yet more preferably in the range of 15 to 25%.

The total content of $B^{3+}$ and $Si^{4+}$ is preferably in the range of 24 to 43%, more preferably in the range of 26 to 43%, still more preferably in the range of 28 to 43%, yet more preferably in the range of 30 to 43%.

The total content of $La^{3+}$, $Gd^{3+}$ and $Y^{3+}$ is preferably in the range of 8 to 24%, more preferably in the range of 10 to 22%, still more preferably in the range of 12 to 20%, yet more preferably in the range of 14 to 18%.

The cationic ratio of the total content of $B^{3+}$ and $Si^{4+}$ to the total content of $La^{3+}$, $Gd^{3+}$ and $Y^{3+}$ (($B^{3+}+Si^{4+}$)/($La^{3+}+Gd^{3+}+Y^{3+}$)) is preferably in the range of 1.25 to 3.50, more preferably in the range of 1.50 to 2.80.

The total content of $Ti^{4+}$, $Nb^{5+}$, $Ta^{5+}$ and $W^{6+}$ is preferably in the range of 12 to 34%, more preferably in the range of 14 to 32%, still more preferably in the range of 16 to 30%, yet more preferably in the range of 18 to 28%.

The total content of $Nb^{5+}$ and $Ta^{5+}$ is preferably in the range of 12 to 34%, more preferably in the range of 13 to 31%, still more preferably in the range of 13 to 28%, yet more preferably in the range of 15 to 25%.

The total content of $Ti^{4+}$ and $W^{6+}$ is preferably in the range of 0 to 5%, more preferably in the range of 0 to 4%, still more preferably in the range of 1 to 3%.

The cationic ratio of the total content of $Nb^{5+}$ and $Ta^{5+}$ to the total content of $Ti^{4+}$, $Nb^{5+}$, $Ta^{5+}$ and $W^{6+}$ (($Nb^{5+}+Ta^{5+}$)/($Ti^{4+}+Nb^{5+}+Ta^{5+}+W^{6+}$)) is preferably in the range of 0.75 to 1.00, more preferably in the range of 0.80 to 1.00.

The cationic ratio of the total content of $B^{3+}$ and $Si^{4+}$ to the total content of $Ti^{4+}$, $Nb^{5+}$, $Ta^{5+}$ and $W^{6+}$ (($Si^{4+}+B^{3+}$)/($Ti^{4+}+Nb^{5+}+Ta^{5+}+W^{6+}$)) is preferably in the range of 0.80 to 3.00, more preferably in the range of 1.30 to 2.50.

The cationic ratio of the total content of $La^{3+}$, $Gd^{3+}$ and $Y^{3+}$ to the total content of $Ti^{4+}$, $Nb^{5+}$, $Ta^{5+}$ and $W^{6+}$ (($La^{3+}+Gd^{3+}+Y^{3+}$)/($Ti^{4+}+Nb^{5+}+Ta^{5+}+W^{6+}$)) is preferably in the range of 0.30 to 1.30, more preferably in the range of 0.40 to 0.90.

The cationic ratio of the content of $Zn^{2+}$ to the total content of $Zn^{2+}$, $Mg^{2+}$, $Ca^{2+}$, $Sr^{2+}$ and $Ba^{2+}$ ($Zn^{2+}/(Zn^{2+}+Mg^{2+}+Ca^{2+}+Sr^{2+}+Ba^{2+}$)) is preferably in the range of 0.90 to 1.00, more preferably 1.00.

[Preferred Glass Composition in Optical Property Range B]

In the compositional range of the optical glass of this invention, preferred compositional ranges having the optical property range B will be described below.

The content of $B^{3+}$ is preferably in the range of 30 to 48%, more preferably in the range of 32 to 48%, still more preferably in the range of 34 to 46%, yet more preferably in the range of 36 to 44%.

The content of $Si^{4+}$ is preferably in the range of 0 to 8%, more preferably in the range of 1 to 7%, still more preferably in the range of 2 to 6%.

The content of $La^{3+}$ is preferably in the range of 6 to 30%, more preferably in the range of 9 to 26%, still more preferably in the range of 11 to 23%, yet more preferably in the range of 13 to 18%.

The content of $Ti^{4+}$ is preferably in the range of 0 to 3.5%, more preferably in the range of 0 to 3%, still more preferably in the range of 0.5 to 2.5%.

The content of $Nb^{5+}$ is preferably in the range of 5 to 20%, more preferably in the range of 5 to 18%, still more preferably in the range of 5 to 16%, yet more preferably in the range of 7 to 14%.

The content of $Ta^{5+}$ is preferably in the range of 1 to 13%, more preferably in the range of 2 to 10%, still more preferably in the range of 2 to 8%, yet more preferably in the range of 2 to 5%.

The content of $W^{6+}$ is preferably in the range of 0 to 4%, more preferably in the range of 0 to 3.5%, more preferably in the range of 0 to 3%.

The content of $Zr^{4+}$ is preferably in the range of 1 to 8%, more preferably in the range of 1 to 5%, still more preferably in the range of 1 to 3%.

The content of $Zn^{2+}$ is preferably in the range of 12 to 38%, more preferably in the range of 13 to 35%, still more preferably 14 to 30%, yet more preferably in the range of 15 to 25%.

The total content of $B^{3+}$ and $Si^{4+}$ is preferably in the range of 34 to 49%, more preferably in the range of 36 to 49%, still more preferably in the range of 38 to 47%, yet more preferably in the range of 40 to 45%.

The total content of $La^{3+}$, $Gd^{3+}$ and $Y^{3+}$ is preferably in the range of 8 to 24%, more preferably in the range of 10 to 22%, still more preferably in the range of 12 to 20%, yet more preferably in the range of 14 to 18%.

The cationic ratio of the total content of $B^{3+}$ and $Si^{4+}$ to the total content of $La^{3+}$, $Gd^{3+}$ and $Y^{3+}$ (($B^{3+}+Si^{4+}$)/($La^{3+}+Gd^{3+}+Y^{3+}$)) is preferably in the range of 1.50 to 4.00, more preferably in the range of 2.00 to 3.50.

The total content of $Ti^{4+}$, $Nb^{5+}$, $Ta^{5+}$ and $W^{6+}$ is preferably in the range of 10 to 26%, more preferably in the range of 12 to 24%, still more preferably in the range of 14 to 22%, yet more preferably in the range of 16 to 20%.

The total content of $Nb^{5+}$ and $Ta^{5+}$ is preferably in the range of 8 to 24%, more preferably in the range of 10 to 22%, still more preferably in the range of 12 to 20%, yet more preferably in the range of 13 to 18%.

The total content of $Ti^{4+}$ and $W^{6+}$ is preferably in the range of 0 to 5%, more preferably in the range of 0 to 4%, still more preferably in the range of 1 to 3%.

The cationic ratio of the total content of $Nb^{5+}$ and $Ta^{5+}$ to the total content of $Ti^{4+}$, $Nb^{5+}$, $Ta^{5+}$ and $W^{6+}$ (($Nb^{5+}+Ta^{5+}$)/($Ti^{4+}+Nb^{5+}+Ta^{5+}+W^{6+}$)) is preferably in the range of 0.75 to 1.00, more preferably in the range of 0.80 to 1.00.

The cationic ratio of the total content of $B^{3+}$ and $Si^{4+}$ to the total content of $Ti^{4+}$, $Nb^{5+}$, $Ta^{5+}$ and $W^{6+}$ (($Si^{4+}+B^{3+}$)/($Ti^{4+}+Nb^{5+}+Ta^{5+}+W^{6+}$)) is preferably in the range of 1.00 to 3.50, more preferably in the range of 2.00 to 3.00.

The cationic ratio of the total content of $La^{3+}$, $Gd^{3+}$ and $Y^{3+}$ to the total content of $Ti^{4+}$, $Nb^{5+}$, $Ta^{5+}$ and $W^{6+}$ (($La^{3+}+Gd^{3+}+Y^{3+}$)/($Ti^{4+}+Nb^{5+}+Ta^{5+}+W^{6+}$)) is preferably in the range of 0.50 to 1.50, more preferably in the range of 0.70 to 1.15.

The cationic ratio of the content of $Zn^{2+}$ to the total content of $Zn^{2+}$, $Mg^{2+}$, $Ca^{2+}$, $Sr^{2+}$ and $Ba^{2+}$ ($Zn^{2+}/(Zn^{2+}+Mg^{2+}+Ca^{2+}+Sr^{2+}+Ba^{2+}$)) is preferably in the range of 0.90 to 1.00, more preferably 1.00.

[Preferred Glass Composition in Optical Property Range C]

In the compositional range of the optical glass of this invention, preferred compositional ranges having the optical property range C will be described below.

The content of $B^{3+}$ is preferably in the range of 30 to 48%, more preferably in the range of 32 to 48%, still more preferably in the range of 34 to 48%, yet more preferably in the range of 36 to 46%.

The content of $Si^{4+}$ is preferably in the range of 0 to 8%, more preferably in the range of 1 to 7%, still more preferably in the range of 1 to 6%.

The content of $La^{3+}$ is preferably in the range of 6 to 30%, more preferably in the range of 9 to 27%, still more preferably in the range of 11 to 25%, yet more preferably in the range of 13 to 23%.

The content of $Ti^{4+}$ is preferably in the range of 0 to 3.5%, more preferably in the range of 0 to 3%, still more preferably in the range of 0 to 2.5%.

The content of $Nb^{5+}$ is preferably in the range of 1 to 20%, more preferably in the range of 2 to 17%, still more preferably in the range of 2 to 15%, yet more preferably in the range of 2 to 13%.

The content of $Ta^{5+}$ is preferably in the range of 1 to 13%, more preferably in the range of 2 to 11%, still more preferably in the range of 2 to 9%, yet more preferably in the range of 3 to 8%.

The content of $W^{6+}$ is preferably in the range of 0 to 4%, more preferably in the range of 0 to 3.5%, more preferably in the range of 0 to 3%.

The content of $Zr^{4+}$ is preferably in the range of 1 to 8%, more preferably in the range of 1 to 5%, still more preferably in the range of 1 to 4%.

The content of $Zn^{2+}$ is preferably in the range of 12 to 38%, more preferably in the range of 13 to 35%, still more preferably 14 to 30%, yet more preferably in the range of 15 to 25%.

The total content of $B^{3+}$ and $Si^{4+}$ is preferably in the range of 34 to 49%, more preferably in the range of 37 to 49%, still more preferably in the range of 39 to 49%, yet more preferably in the range of 41 to 47%.

The total content of $La^{3+}$, $Gd^{3+}$ and $Y^{3+}$ is preferably in the range of 13 to 29%, more preferably in the range of 13 to 27%, still more preferably in the range of 14 to 25%, yet more preferably in the range of 15 to 23%.

The cationic ratio of the total content of $B^{3+}$ and $Si^{4+}$ to the total content of $La^{3+}$, $Gd^{3+}$ and $Y^{3+}$ ($(B^{3+}+Si^{4+})/(La^{3+}+Gd^{3+}+Y^{3+})$) is preferably in the range of 1.50 to 4.00, more preferably in the range of 1.70 to 3.00.

The total content of $Ti^{4+}$, $Nb^{5+}$, $Ta^{5+}$ and $W^{6+}$ is preferably in the range of 10 to 24%, more preferably in the range of 11 to 22%, still more preferably in the range of 11 to 20%, yet more preferably in the range of 13 to 18%.

The total content of $Nb^{5+}$ and $Ta^{5+}$ is preferably in the range of 6 to 23%, more preferably in the range of 6 to 21%, still more preferably in the range of 6 to 19%, yet more preferably in the range of 8 to 17%.

The total content of $Ti^{4+}$ and $W^{6+}$ is preferably in the range of 0 to 5%, more preferably in the range of 0 to 4%, still more preferably in the range of 1 to 4%.

The cationic ratio of the total content of $Nb^{5+}$ and $Ta^{5+}$ to the total content of $Ti^{4+}$, $Nb^{5+}$, $Ta^{5+}$ and $W^{6+}$ ($(Nb^{5+}+Ta^{5+})/(Ti^{4+}+Nb^{5+}+Ta^{5+}+W^{6+})$) is preferably in the range of 0.70 to 0.99, more preferably in the range of 0.70 to 0.95.

The cationic ratio of the total content of $B^{3+}$ and $Si^{4+}$ to the total content of $Ti^{4+}$, $Nb^{5+}$, $Ta^{5+}$ and $W^{6+}$ ($(B^{3+}+Si^{4+})/(Ti^{4+}+Nb^{5+}+Ta^{5+}+W^{6+})$) is preferably in the range of 1.00 to 3.50, more preferably in the range of 2.00 to 3.20.

The cationic ratio of the total content of $La^{3+}$, $Gd^{3+}$ and $Y^{3+}$ to the total content of $Ti^{4+}$, $Nb^{5+}$, $Ta^{5+}$ and $W^{6+}$ ($(La^{3+}+Gd^{3+}+Y^{3+})/(Ti^{4+}+Nb^{5+}+Ta^{5+}+W^{6+})$) is preferably in the range of 0.50 to 1.80, more preferably in the range of 0.70 to 1.60.

The cationic ratio of the content of $Zn^{2+}$ to the total content of $Zn^{2+}$, $Mg^{2+}$, $Ca^{2+}$, $Sr^{2+}$ and $Ba^{2+}$ ($Zn^{2+}/(Zn^{2+}+Mg^{2+}+Ca^{2+}+Sr^{2+}+Ba^{2+})$) is preferably in the range of 0.90 to 1.00, more preferably 1.00.

[Glass Transition Temperature]

For inhibiting an increase in press-molding temperature and inhibiting the promotion of a chemical reaction between a press mold and a glass, it is very important to keep the glass transition temperature involved in attaining of the higher-refractivity lower-dispersion from increasing.

A preferred embodiment of the optical glass of this invention is an optical glass having a glass transition temperature of 630° C. or lower, in which the contents of components that are liable to undergo a chemical reaction with a press mold are limited and which exhibits excellent precision press-moldability owing to the low glass transition temperature.

From the above point of view, the glass transition temperature in this invention is preferably in the range of 620° C. or lower, more preferably in the range of 610° C. or lower, still more preferably in the range of 605° C. or lower.

Similarly, the sag temperature in this invention is preferably in the range of 680° C. or lower, more preferably in the range of 670° C. or lower, still more preferably in the range of 660° C. or lower, yet more preferably in the range of 650° C. or lower.

[Liquidus Temperature]

The optical glass of this invention is excellent in thermal stability, and it can be imparted with a liquidus temperature of 1,200° C. or lower. Glass raw materials can be hence melted at 1,300° C. or lower, and the corrosion of a melting crucible by a glass can be inhibited. As a result, it is made possible to get around a problem that a substance such as platinum constituting a crucible is corroded by a glass and included in the glass to constitute a foreign matter or dissolved as an ion to cause the coloring of the glass.

Further, when the liquidus temperature is adjusted to 1,200° C. or lower, the temperature of a molten glass is decreased and its volatility is controlled, so that the occurrence of striae and the variance of optical properties due to volatilization can be decreased or suppressed. When the temperature of a molten glass can be decreased, there is also an advantage that the viscosity of a glass when it is caused to flow out and shaped or molded can be brought into a range suitable for shaping or molding.

In this invention, the liquidus temperature is preferably in the range of 1,150° C. or lower, more preferably in the range of 1,100° C. or lower.

When the liquidus temperature is low as described above, it is very advantageous for carrying out a method in which a molten glass is caused to flow out, a predetermined weight of molten glass mass is separated from the glass that flows out and it is shaped into a precision press-molding preform in the process of solidification of the glass mass. A method of shaping the above preform will be described later.

[Partial Dispersion Property]

For implementing chromatic aberration correction of high order in an image-sensing optical system, a projector optical system, etc., it is effective to combine a lens formed of a low-dispersion glass and a lens formed of a high-dispersion glass. A low-dispersion glass that has a small partial dispersion ratio is more effective for chromatic aberration correction of high order. The optical glass of this invention has a small partial dispersion ratio for a high-refractivity low-dispersion glass, and it has a Pg,F value of 0.57 to 0.62. Pg,F is represented as $$Pg,F=(ng-nF)/(nF-nc)$$

by using ng, nF and nc that are refractive indices to g ray, F ray and c ray.

In a partial dispersion ratio Pg,F-Abbe's number vd chart, when a partial dispersion ratio on a normal line as a reference for a normal partial dispersion glass is taken as $Pg,F^{(0)}$, $Pg,F^{(0)}$ is represented by the following expression using an Abbe's number vd.

$$Pg,F^{(0)}=0.6483-(0.0018 \times nd)$$

$\Delta Pg,F$ is a deviation of the partial dispersion ratio Pg,F from the above normal line, and is represented by the following expression.

$$\Delta Pg,F=Pg,F-Pg,F^{(0)}=Pg,F+(0.0018 \times vd)-0.6483$$

A preferred embodiment of the optical glass of this invention has a deviation $\Delta Pg,F$ of 0.007 or less and is hence suitable as an optical element material for chromatic aberration correction of high order. The $\Delta Pg,F$ in this invention is preferably in the range of 0.006 or less, more preferably in the range of 0.003 or less, still more preferably in the range of 0.002 or less, yet more preferably in the range of 0 or less.

[Coloring]

The optical glass of this invention is remarkably less colored and exhibits high transmittance in a broad range of visible light region. The coloring degree of an optical glass is represented by $\lambda 70$, $\lambda 5$, etc. In the coloring degree, measurement light is caused to enter a glass having a pair of optically polished surfaces and having a surface to surface distance (thickness) of 10 mm±0.1 mm at right angles with the above surfaces, λ70 is a wavelength at which an external transmittance (including a reflection loss on the glass surface) obtained by dividing the intensity Iout of light that a glass transmits with the intensity Iin of incident light comes to be 70% in a wavelength region of 280 to 700 nm, and λ5 is a wavelength at which the external transmittance comes to be 5% in the above wavelength region.

In this invention, λ70 is preferably in the range of 470 nm or less, more preferably in the range of 450 nm or less, still more preferably in the range of 430 nm or less, yet more preferably in the range of 410 nm or less, and λ5 is preferably in the range of 370 nm or less, more preferably in the range of 365 nm or less, still more preferably in the range of 360 nm or less, yet more preferably in the range of 355 nm or less, further more preferably in the range of 350 nm or less.

[Production of Optical Glass]

The optical glass of this invention can be obtained by weighing and formulating oxides, carbonates, sulfates, nitrates, hydroxides, etc., as raw materials such that an intended glass composition is obtained, fully mixing them to prepare a mixture batch, performing the heating, melting, defoaming and stirring of the batch in a melting vessel to prepare a molten glass and molding/shaping it. Specifically, it can be made by a known melting method.

[Precision Press-Molding Preform]

The precision press-molding preform of this invention will be explained below.

The precision press-molding preform of this invention has a feature that it is formed of the above optical glass of this invention.

The above precision press-molding preform (to be referred to as "preform" hereinafter) means a glass mass to be used in precision press-molding and is a glass shaped material having a mass corresponding to the mass of a precision press-molded product.

The preform will be explained in detail below.

The preform means a pre-shaped glass material that is subjected to precision press-molding by heating, and the above precision press-molding is also called optics molding by another name as is well known and is a method in which the function surface of an optical element is formed by the transfer of molding surface form of a press mold. The optical function surface means a surface that refracts, reflects, diffracts, and lets in/lets out light that is to be controlled, and the lens surface of a lens corresponds to the above optical function surface.

The preform is preferably surface-coated with a release film for preventing the reaction and fusion of a glass with/to the molding surface of a press mold and at the same time rendering the ductility of a glass excellent along the molding surface. The release film includes noble metals (platinum, platinum alloy), oxides (oxides of Si, Al, Zr, La, Y, etc.), nitrides (nitrides of B, Si, Al, etc.) and a carbon-containing film. The carbon-containing film is desirably a film containing carbon as a main component (a film having the largest carbon content than any other element when the contents of elements in the film are expressed by atomic %). Specifically, examples thereof include a carbon film, a hydrocarbon film, etc. As a method of forming a carbon-containing film, there may be employed a known method such as a vacuum vapor deposition method, a sputtering method, an ion-plating method, etc., in which carbon material is used, or a known method such as thermal decomposition using as a raw material gas such as a hydrocarbon. The other films can be formed by a vapor deposition method, a sputtering method, an ion plating method, a sol-gel method, or the like.

The preform is produced through steps of preparing a molten glass by heating and melting glass raw materials and shaping the above molten glass.

The first example of production of a preform is a method of separating a molten glass mass having a predetermined weight from a molten glass, and cooling it to shape a preform having a weight equal to the weight of the above molten glass mass. For example, glass raw materials are melted, clarified and homogenized to prepare a homogeneous molten glass, and the molten glass is caused to flow out of a temperature-adjusted outflow nozzle or pipe made of platinum or platinum alloy. When a preform of a small size or a spherical preform is shaped, the molten glass is caused to flow out of the outflow nozzle as a molten glass drop having a predetermined weight, and it is received with a preform shaping mold and shaped into a preform. Alternatively, molten glass drops having a predetermined weight each are similarly caused to drop in liquid nitrogen from an outflow nozzle and shaped into preforms. When a preform of an intermediate or large size is produced, the molten glass flow is caused to flow downward from an outflow pipe, the forward end of the molten glass flow is received with a preform shaping mold, a narrow portion is formed in molten glass flow between the nozzle and the preform shaping mold, then, the preform shaping mold is rapidly moved vertically downward to separate a molten glass flow in the narrow portion by means of a surface tension of the molten glass, and a molten glass mass having a predetermined weight is received with a receiving member and shaped into a preform. Alternatively, a glass mass while it is in a softened state may be pressed on a preform shaping mold to form a preform having a form similar to the form of an optical element to be obtained by precision press-molding and having a smooth surface.

For producing a preform having a smooth surface free of a scratch, soiling, a crease or surface alteration, e.g., a preform having a free surface, there is employed a method in which a molten glass mass is shaped into a preform while a gas pressure is applied to the molten glass mass above a preform shaping mold, or a method in which molten glass drops are placed in a medium such as liquid nitrogen, prepared by cooling a substance that is a gas under room temperature and atmospheric pressure to render it liquid, and shaped into preforms.

When a molten glass mass is shaped into a preform while it is floated, a gas (floating gas) is blown to the molten glass mass, and an upward gas pressure is applied to it. When the viscosity of the molten glass mass is too low, floating gas is included in the glass and remains in the preform in the form of bubbles. However, when the viscosity of the molten glass gob is adjusted to 3 to 60 dPa·s, the glass mass can be caused to float without any floating gas being included in the glass.

The gas that is used for blowing the floating gas to the preform is selected from air, $N_2$ gas, $O_2$ gas, Ar gas, He gas, water vapor, etc. The gas pressure is not specially limited so long as the preform can be floated without coming in contact with solids such as a shaping mold surface, etc.

Many precision press-molded products (e.g., optical elements) produced from preforms have an axis of rotational symmetry like lenses, and the form of preforms are hence desirably forms having an axis of rotational symmetry.

The second example of production of a preform is a method of casting a homogeneous molten glass into a casting mold to form a shaped material, then, removing a strain of the shaped material by annealing, cutting or splitting it into a plurality of glass pieces having predetermined dimension and form each, polishing glass pieces to render their surfaces smooth and obtaining preforms having predetermined masses each. The thus-produced preforms are preferably surface-coated with a carbon-containing film each before they are used.

[Optical Element]

The optical element of this invention will be explained below. The optical element of this invention has a feature that it is formed of the above optical glass of this invention. Specifically, examples of the optical element include an aspherical lens, a spherical lens, lenses such as a plano-concave lens, a plano-convex lens, a biconcave lens, a biconvex lens, a convex meniscus lens, a concave meniscus lens, etc., a microlens, a lens array, a lens with a diffraction grating, a prism, a prism with a lens function, etc. Their surfaces each may be provided with an anti-reflection film, a partial reflection film having wavelength selectivity, etc.

The optical element of this invention is formed of a glass that has high-refractivity low-dispersion properties and that has a small $\Delta Pg,F$, and when it is combined with an optical element formed of other glass, chromatic aberration correction of high order can be implemented. Further, since the optical element of this invention is formed of a glass having high refractivity, optical systems such as an image-sensing optical system or a projector optical system in which the optical element is used can be downsized.

[Process for Producing Optical Element]

The process for producing an optical element, provided by this invention, will be explained below. The process for producing an optical element, provided by this invention, comprises the steps of heating the above precision press-molding preform of this invention and precision press-molding the preform with a press mold.

The steps of heating a press mold and a preform and pressing the preform are preferably carried out in a non-oxidizing gas atmosphere such as nitrogen gas or a mixture gas containing nitrogen gas and hydrogen gas, for preventing the molding surface of the press mold or a release film formed on the above molding surface from oxidizing. In the non-oxidizing gas atmosphere, a carbon-containing film coated on the preform surface is not oxidized and remains on the surface of a precision press-molded product. This film is to be finally removed, and for removing the carbon-containing film relatively easily and completely, the precision press-molded product can be heated in an oxidizing atmosphere, for example, in the air. The carbon-containing film is to be oxidized and removed at a temperature at which the precision press-molded product is not deformed by heating. Specifically, the oxidation and removal are preferably carried out in a temperature range of less than the glass transition temperature of a glass.

The precision press-molding uses a press mold having a molding surface that is processed highly precisely beforehand, and the molding surface may be provided with a film for improving the lubricity of a glass when the precision press-molding is carried out. The above film includes a carbon-containing film, a nitride film and a noble metal film, and the carbon-containing film preferably includes a hydrogenated carbon film, a carbon film, etc. In the precision press-molding, a preform is supplied between a pair of opposing upper and lower mold members whose molding surfaces are precisely processed, then, both the mold and the preform are heated to a temperature at which the glass comes to have a viscosity of $10^5$ to $10^9$ dPa·s, the preform is thus-softened, and it is press-molded to accurately transfer a form of the molding surface of the mold to the glass.

Alternately, a preform which is temperature-elevated in advance to a temperature at which the glass comes to have a viscosity of $10^4$ to $10^8$ dPa·s is supplied between a pair of opposing upper and lower mold members whose molding surfaces are precisely processed, and it is press-molded, whereby a form of the molding surface of the mold can be accurately transferred to the glass.

The pressure and time period for pressing can be determined as required by taking a glass viscosity, etc., into account. For example, the pressure can be set at approximately 5 to 15 MPa, and the time period for pressing can be set for 10 to 300 seconds. The pressing conditions such as a pressing pressure and time period can be determined as required in ranges that are known and depending upon the form and dimensions of a molded product.

Thereafter, the mold and the precision press-molded product are cooled, and preferably, when a temperature of a strain point or lower is reached, the mold members are separated and the precision press-molded product is taken out. For accurately bringing optical properties into agreement with desired values, the annealing conditions of the molded product during cooling, e.g., an annealing speed, etc., may be adjusted as required.

The process for producing the above optical element can be largely classified into the following two methods. The first process is a process for producing an optical element in which a preform is introduced into a press mold and the press mold and the preform are heated together, and it is a preferred process when importance is attached to improvements of molding accuracy such as surface accuracy, decentering accuracy, etc. The second process is a process for producing an optical element in which a preform is heated and introduced into a pre-heated mold and precision press-molding is carried out. It is a preferred process when importance is attached to an improvement in productivity.

The optical element of this invention can be also produced without any press-molding step. For example, a homogeneous molten glass is cast into a casting mold to shape a glass block, it is annealed to remove a strain and optical properties are adjusted by adjusting annealing conditions such that the refractivity of the glass becomes a desired value, then, the glass block is cut or split to prepare glass pieces, and they are ground and polished to complete optical elements.

EXAMPLES

This invention will be more specifically explained with reference to Examples hereinafter, while this invention shall not be limited by these Examples.

Example 1

Corresponding oxides, carbonates, sulfates, nitrates, hydroxides, etc., were used as raw materials for introducing components that would give glass compositions shown in Tables 4-1 to 4-9. The raw materials were weighed and fully mixed to prepare a formulated raw material, and it was placed in a platinum crucible, heated and melted. After it was melted, a molten glass was cast into a casting mold, and immediately after it was allowed to cool to a temperature around its glass transition temperature, it was placed in an annealing furnace to carry out annealing treatment in the range of transition temperature of the glass for about 1 hour. Then, the glass was allowed to cool in the furnace to room temperature. In this manner, optical glasses Nos. 1 to 51 shown in Tables 4-1 to 4-9 were obtained.

In the thus-obtained optical glasses, no crystal observable through a microscope was deposited.

Tables 5-1 to 5-8 show various properties of the above-obtained optical glasses.

Tables 6-1 to 6-8 show compositions of components as oxides by mass % with regard to optical glasses Nos. 1 to 51.

TABLE 4-1

| | No. | | | | | |
|---|---|---|---|---|---|---|
| | 1 | 2 | 3 | 4 | 5 | 6 |
| $Si^{4+}$(cat. %) | 2.33 | 2.33 | 2.33 | 2.33 | 2.33 | 2.33 |
| $B^{3+}$(cat. %) | 42.04 | 40.54 | 40.54 | 40.54 | 40.54 | 40.54 |
| $Li^{+}$(cat. %) | 0.00 | 0.00 | 0.00 | 0.00 | 0.00 | 0.00 |
| $Na^{+}$(cat. %) | 0.00 | 0.00 | 0.00 | 0.00 | 0.00 | 0.00 |
| $K^{+}$(cat. %) | 0.00 | 0.00 | 0.00 | 0.00 | 0.00 | 0.00 |
| $Mg^{2+}$(cat. %) | 0.00 | 0.00 | 0.00 | 0.00 | 0.00 | 0.00 |
| $Ca^{2+}$(cat. %) | 0.00 | 0.00 | 0.00 | 0.00 | 0.00 | 0.00 |
| $Sr^{2+}$(cat. %) | 0.00 | 0.00 | 0.00 | 0.00 | 0.00 | 0.00 |
| $Ba^{2+}$(cat. %) | 0.00 | 0.00 | 0.00 | 0.00 | 0.00 | 0.00 |
| $Zn^{2+}$(cat. %) | 19.77 | 19.77 | 19.77 | 19.77 | 19.77 | 19.77 |
| $La^{3+}$(cat. %) | 14.27 | 15.77 | 15.77 | 15.77 | 17.77 | 15.77 |
| $Gd^{3+}$(cat. %) | 0.00 | 0.00 | 0.00 | 0.00 | 0.00 | 2.00 |
| $Y^{3+}$(cat. %) | 0.00 | 0.00 | 0.00 | 0.00 | 0.00 | 0.00 |
| $Yb^{3+}$(cat. %) | 0.00 | 0.00 | 0.00 | 0.00 | 0.00 | 0.00 |
| $Zr^{4+}$(cat. %) | 2.33 | 2.33 | 2.33 | 2.33 | 2.33 | 2.33 |
| $Ti^{4+}$(cat. %) | 2.33 | 2.33 | 1.33 | 2.33 | 1.33 | 1.33 |
| $Nb^{5+}$(cat. %) | 12.28 | 8.98 | 11.98 | 12.98 | 9.98 | 9.98 |
| $Ta^{5+}$(cat. %) | 4.65 | 4.65 | 4.65 | 2.65 | 4.65 | 4.65 |
| $W^{6+}$(cat. %) | 0.00 | 3.30 | 1.30 | 1.30 | 1.30 | 1.30 |
| $Te^{4+}$(cat. %) | 0.00 | 0.00 | 0.00 | 0.00 | 0.00 | 0.00 |
| $Ge^{4+}$(cat. %) | 0.00 | 0.00 | 0.00 | 0.00 | 0.00 | 0.00 |
| $Bi^{3+}$(cat. %) | 0.00 | 0.00 | 0.00 | 0.00 | 0.00 | 0.00 |
| $Al^{3+}$(cat. %) | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$(cat. %) | 44.37 | 42.87 | 42.87 | 42.87 | 42.87 | 42.87 |
| $Mg^{2+} + Ca^{2+} + Sr^{2+} + Ba^{2+} + Zn^{2+}$(cat. %) | 19.77 | 19.77 | 19.77 | 19.77 | 19.77 | 19.77 |
| $La^{3+} + Gd^{3+} + Y^{3+}$(cat. %) | 14.27 | 15.77 | 15.77 | 15.77 | 17.77 | 17.77 |
| $Ti^{4+} + W^{6+}$(cat. %) | 2.33 | 5.63 | 2.63 | 3.63 | 2.63 | 2.63 |
| $Nb^{5+} + Ta^{5+}$(cat. %) | 16.93 | 13.63 | 16.63 | 15.63 | 14.63 | 14.63 |
| $Ti^{4+} + Nb^{5+} + Ta^{5+} + W^{6+}$(cat. %) | 19.26 | 19.26 | 19.26 | 19.26 | 17.26 | 17.26 |
| $(Si^{4+} + B^{3+})/(La^{3+} + Gd^{3+} + Y^{3+})$ | 3.11 | 2.72 | 2.72 | 2.72 | 2.41 | 2.41 |
| $(Si^{4+} + B^{3+})/(Ti^{4+} + Nb^{5+} + Ta^{5+} + W^{6+})$ | 2.30 | 2.23 | 2.23 | 2.23 | 2.48 | 2.48 |
| $Zn^{2+}/(Mg^{2+} + Ca^{2+} + Sr^{2+} + Ba^{2+} + Zn^{2+})$ | 1.00 | 1.00 | 1.00 | 1.00 | 1.00 | 1.00 |
| $(La^{3+} + Gd^{3+} + Y^{3+})/(Ti^{4+} + Nb^{5+} + Ta^{5+} + W^{6+})$ | 0.74 | 0.82 | 0.82 | 0.82 | 1.03 | 1.03 |
| $(Nb^{5+} + Ta^{5+})/(Ti^{4+} + Nb^{5+} + Ta^{5+} + W^{6+})$ | 0.88 | 0.71 | 0.86 | 0.81 | 0.85 | 0.85 |

TABLE 4-2

| | No. | | | | | |
|---|---|---|---|---|---|---|
| | 7 | 8 | 9 | 10 | 11 | 12 |
| $Si^{4+}$(cat. %) | 2.33 | 2.33 | 2.33 | 2.33 | 0.00 | 2.33 |
| $B^{3+}$(cat. %) | 40.54 | 40.54 | 40.54 | 40.54 | 42.87 | 40.04 |
| $Li^{+}$(cat. %) | 0.00 | 0.00 | 0.00 | 0.00 | 0.00 | 0.00 |
| $Na^{+}$(cat. %) | 0.00 | 0.00 | 0.00 | 0.00 | 0.00 | 0.00 |
| $K^{+}$(cat. %) | 0.00 | 0.00 | 0.00 | 0.00 | 0.00 | 0.00 |
| $Mg^{2+}$(cat. %) | 0.00 | 0.00 | 0.00 | 0.00 | 0.00 | 0.00 |
| $Ca^{2+}$(cat. %) | 0.00 | 0.00 | 0.00 | 0.00 | 0.00 | 0.50 |
| $Sr^{2+}$(cat. %) | 0.00 | 0.00 | 0.00 | 0.00 | 0.00 | 0.00 |
| $Ba^{2+}$(cat. %) | 0.00 | 0.00 | 0.00 | 0.00 | 0.00 | 0.00 |
| $Zn^{2+}$(cat. %) | 19.77 | 20.77 | 20.77 | 21.27 | 21.27 | 20.77 |
| $La^{3+}$(cat. %) | 15.77 | 15.77 | 15.77 | 15.77 | 15.77 | 15.77 |
| $Gd^{3+}$(cat. %) | 0.00 | 0.00 | 0.00 | 0.00 | 0.00 | 0.00 |
| $Y^{3+}$(cat. %) | 2.00 | 0.00 | 0.00 | 0.00 | 0.00 | 0.00 |
| $Yb^{3+}$(cat. %) | 0.00 | 0.00 | 0.00 | 0.00 | 0.00 | 0.00 |
| $Zr^{4+}$(cat. %) | 2.33 | 2.33 | 2.83 | 2.33 | 2.33 | 2.33 |
| $Ti^{4+}$(cat. %) | 1.33 | 1.33 | 1.33 | 0.83 | 0.83 | 1.33 |
| $Nb^{5+}$(cat. %) | 9.98 | 10.98 | 10.98 | 12.98 | 11.48 | 11.48 |
| $Ta^{5+}$(cat. %) | 4.65 | 4.65 | 4.65 | 3.15 | 4.65 | 4.65 |
| $W^{6+}$(cat. %) | 1.30 | 1.30 | 0.80 | 0.80 | 0.80 | 0.80 |
| $Te^{4+}$(cat. %) | 0.00 | 0.00 | 0.00 | 0.00 | 0.00 | 0.00 |
| $Ge^{4+}$(cat. %) | 0.00 | 0.00 | 0.00 | 0.00 | 0.00 | 0.00 |
| $Bi^{3+}$(cat. %) | 0.00 | 0.00 | 0.00 | 0.00 | 0.00 | 0.00 |
| $Al^{3+}$(cat. %) | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$(cat. %) | 42.87 | 42.87 | 42.87 | 42.87 | 42.87 | 42.37 |
| $Mg^{2+} + Ca^{2+} + Sr^{2+} + Ba^{2+} + Zn^{2+}$(cat. %) | 19.77 | 20.77 | 20.77 | 21.27 | 21.27 | 21.27 |
| $La^{3+} + Gd^{3+} + Y^{3+}$(cat. %) | 17.77 | 15.77 | 15.77 | 15.77 | 15.77 | 15.77 |
| $Ti^{4+} + W^{6+}$(cat. %) | 2.63 | 2.63 | 2.13 | 1.63 | 1.63 | 2.13 |
| $Nb^{5+} + Ta^{5+}$(cat. %) | 14.63 | 15.63 | 15.63 | 16.13 | 16.13 | 16.13 |

TABLE 4-2-continued

| | No. | | | | | |
|---|---|---|---|---|---|---|
| | 7 | 8 | 9 | 10 | 11 | 12 |
| $Ti^{4+} + Nb^{5+} + Ta^{5+} + W^{6+}$ (cat. %) | 17.26 | 18.26 | 17.76 | 17.76 | 17.76 | 18.26 |
| $(Si^{4+} + B^{3+})/(La^{3+} + Gd^{3+} + Y^{3+})$ | 2.41 | 2.72 | 2.72 | 2.72 | 2.72 | 2.69 |
| $(Si^{4+} + B^{3+})/(Ti^{4+} + Nb^{5+} + Ta^{5+} + W^{6+})$ | 2.48 | 2.35 | 2.41 | 2.41 | 2.41 | 2.32 |
| $Zn^{2+}/(Mg^{2+} + Ca^{2+} + Sr^{2+} + Ba^{2+} + Zn^{2+})$ | 1.00 | 1.00 | 1.00 | 1.00 | 1.00 | 0.98 |
| $(La^{3+} + Gd^{3+} + Y^{3+})/(Ti^{4+} + Nb^{5+} + Ta^{5+} + W^{6+})$ | 1.03 | 0.86 | 0.89 | 0.89 | 0.89 | 0.86 |
| $(Nb^{5+} + Ta^{5+})/(Ti^{4+} + Nb^{5+} + Ta^{5+} + W^{6+})$ | 0.85 | 0.86 | 0.88 | 0.91 | 0.91 | 0.88 |

TABLE 4-3

| | No. | | | | | |
|---|---|---|---|---|---|---|
| | 13 | 14 | 15 | 16 | 17 | 18 |
| $Si^{4+}$ (cat. %) | 2.33 | 2.34 | 2.35 | 3.83 | 4.33 | 3.83 |
| $B^{3+}$ (cat. %) | 40.04 | 40.26 | 40.46 | 39.04 | 38.54 | 38.04 |
| $Li^{+}$ (cat. %) | 0.00 | 0.00 | 0.00 | 0.00 | 0.00 | 0.00 |
| $Na^{+}$ (cat. %) | 0.00 | 0.00 | 0.00 | 0.00 | 0.00 | 0.00 |
| $K^{+}$ (cat. %) | 0.00 | 0.00 | 0.00 | 0.00 | 0.00 | 0.00 |
| $Mg^{2+}$ (cat. %) | 0.00 | 0.00 | 0.00 | 0.00 | 0.00 | 0.00 |
| $Ca^{2+}$ (cat. %) | 0.00 | 0.00 | 0.00 | 0.00 | 0.00 | 0.00 |
| $Sr^{2+}$ (cat. %) | 0.00 | 0.00 | 0.00 | 0.00 | 0.00 | 0.00 |
| $Ba^{2+}$ (cat. %) | 0.00 | 0.00 | 0.00 | 0.00 | 0.00 | 0.00 |
| $Zn^{2+}$ (cat. %) | 21.27 | 21.88 | 21.99 | 20.77 | 20.77 | 21.77 |
| $La^{3+}$ (cat. %) | 16.27 | 15.85 | 15.93 | 15.77 | 15.77 | 15.77 |
| $Gd^{3+}$ (cat. %) | 0.00 | 0.00 | 0.00 | 0.00 | 0.00 | 0.00 |
| $Y^{3+}$ (cat. %) | 0.00 | 0.00 | 0.00 | 0.00 | 0.00 | 0.00 |
| $Yb^{3+}$ (cat. %) | 0.00 | 0.00 | 0.00 | 0.00 | 0.00 | 0.00 |
| $Zr^{4+}$ (cat. %) | 1.83 | 1.83 | 1.84 | 2.33 | 2.33 | 2.33 |
| $Ti^{4+}$ (cat. %) | 1.33 | 1.33 | 1.34 | 1.33 | 1.33 | 1.33 |
| $Nb^{5+}$ (cat. %) | 11.48 | 11.53 | 11.09 | 11.48 | 11.48 | 11.48 |
| $Ta^{5+}$ (cat. %) | 4.65 | 4.17 | 4.19 | 4.65 | 4.65 | 4.65 |
| $W^{6+}$ (cat. %) | 0.80 | 0.81 | 0.81 | 0.80 | 0.80 | 0.80 |
| $Te^{4+}$ (cat. %) | 0.00 | 0.00 | 0.00 | 0.00 | 0.00 | 0.00 |
| $Ge^{4+}$ (cat. %) | 0.00 | 0.00 | 0.00 | 0.00 | 0.00 | 0.00 |
| $Bi^{3+}$ (cat. %) | 0.00 | 0.00 | 0.00 | 0.00 | 0.00 | 0.00 |
| $Al^{3+}$ (cat. %) | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ (cat. %) | 42.37 | 42.60 | 42.81 | 42.87 | 42.87 | 41.87 |
| $Mg^{2+} + Ca^{2+} + Sr^{2+} + Ba^{2+} + Zn^{2+}$ (cat. %) | 21.27 | 21.88 | 21.99 | 20.77 | 20.77 | 21.77 |
| $La^{3+} + Gd^{3+} + Y^{3+}$ (cat. %) | 16.27 | 15.85 | 15.93 | 15.77 | 15.77 | 15.77 |
| $Ti^{4+} + W^{6+}$ (cat. %) | 2.13 | 2.14 | 2.15 | 2.13 | 2.13 | 2.13 |
| $Nb^{5+} + Ta^{5+}$ (cat. %) | 16.13 | 15.70 | 15.28 | 16.13 | 16.13 | 16.13 |
| $Ti^{4+} Nb^{5+} + Ta^{5+} + W^{6+}$ (cat. %) | 18.26 | 17.84 | 17.43 | 18.26 | 18.26 | 18.26 |
| $(Si^{4+} + B^{3+})/(La^{3+} + Gd^{3+} + Y^{3+})$ | 2.60 | 2.69 | 2.69 | 2.72 | 2.72 | 2.66 |
| $(Si^{4+} + B^{3+})/(Ti^{4+} + Nb^{5+} + Ta^{5+} + W^{6+})$ | 2.32 | 2.39 | 2.46 | 2.35 | 2.35 | 2.29 |
| $Zn^{2+}/(Mg^{2+} + Ca^{2+} + Sr^{2+} + Ba^{2+} + Zn^{2+})$ | 1.00 | 1.00 | 1.00 | 1.00 | 1.00 | 1.00 |
| $(La^{3+} + Gd^{3+} + Y^{3+})/(Ti^{4+} + Nb^{5+} + Ta^{5+} + W^{6+})$ | 0.89 | 0.89 | 0.91 | 0.86 | 0.86 | 0.86 |
| $(Nb^{5+} + Ta^{5+})/(Ti^{4+} + Nb^{5+} + Ta^{5+} + W^{6+})$ | 0.88 | 0.88 | 0.88 | 0.88 | 0.88 | 0.88 |

TABLE 4-4

| | No. | | | | | |
|---|---|---|---|---|---|---|
| | 19 | 20 | 21 | 22 | 23 | 24 |
| $Si^{4+}$ (cat. %) | 3.83 | 4.83 | 4.85 | 3.83 | 3.83 | 3.83 |
| $B^{3+}$ (cat. %) | 39.04 | 39.04 | 38.25 | 39.04 | 39.04 | 40.04 |
| $Li^{+}$ (cat. %) | 0.00 | 0.00 | 0.00 | 0.00 | 0.00 | 0.00 |
| $Na^{+}$ (cat. %) | 0.00 | 0.00 | 0.00 | 0.00 | 0.00 | 0.00 |
| $K^{+}$ (cat. %) | 0.00 | 0.00 | 0.00 | 0.00 | 0.00 | 0.00 |
| $Mg^{2+}$ (cat. %) | 0.00 | 0.00 | 0.00 | 0.00 | 0.00 | 0.00 |
| $Ca^{2+}$ (cat. %) | 0.00 | 0.00 | 0.00 | 0.00 | 0.00 | 0.00 |
| $Sr^{2+}$ (cat. %) | 0.00 | 0.00 | 0.00 | 0.00 | 0.00 | 0.00 |
| $Ba^{2+}$ (cat. %) | 0.00 | 0.00 | 0.00 | 0.00 | 0.00 | 0.00 |
| $Zn^{2+}$ (cat. %) | 20.77 | 19.77 | 20.37 | 20.77 | 20.77 | 20.77 |
| $La^{3+}$ (cat. %) | 15.77 | 15.77 | 15.85 | 17.77 | 17.77 | 15.77 |
| $Gd^{3+}$ (cat. %) | 0.00 | 0.00 | 0.00 | 0.00 | 0.00 | 0.00 |
| $Y^{3+}$ (cat. %) | 0.00 | 0.00 | 0.00 | 0.00 | 0.00 | 0.00 |
| $Yb^{3+}$ (cat. %) | 0.00 | 0.00 | 0.00 | 0.00 | 0.00 | 0.00 |
| $Zr^{4+}$ (cat. %) | 2.33 | 2.33 | 2.34 | 2.33 | 2.33 | 2.33 |

TABLE 4-4-continued

| | No. | | | | | |
|---|---|---|---|---|---|---|
| | 19 | 20 | 21 | 22 | 23 | 24 |
| $Ti^{4+}$(cat. %) | 1.33 | 1.33 | 1.33 | 1.33 | 1.33 | 1.33 |
| $Nb^{5+}$(cat. %) | 7.48 | 11.48 | 11.53 | 9.48 | 11.48 | 10.48 |
| $Ta^{5+}$(cat. %) | 8.65 | 4.65 | 4.67 | 4.65 | 2.65 | 4.65 |
| $W^{6+}$(cat. %) | 0.80 | 0.80 | 0.81 | 0.80 | 0.80 | 0.80 |
| $Te^{4+}$(cat. %) | 0.00 | 0.00 | 0.00 | 0.00 | 0.00 | 0.00 |
| $Ge^{4+}$(cat. %) | 0.00 | 0.00 | 0.00 | 0.00 | 0.00 | 0.00 |
| $Bi^{3+}$(cat. %) | 0.00 | 0.00 | 0.00 | 0.00 | 0.00 | 0.00 |
| $Al^{3+}$(cat. %) | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$(cat. %) | 42.87 | 43.87 | 43.10 | 42.87 | 42.87 | 43.87 |
| $Mg^{2+} + Ca^{2+} + Sr^{2+} + Ba^{2+} + Zn^{2+}$(cat. %) | 20.77 | 19.77 | 20.37 | 20.77 | 20.77 | 20.77 |
| $La^{3+} + Gd^{3+} + Y^{3+}$(cat. %) | 15.77 | 15.77 | 15.85 | 17.77 | 17.77 | 15.77 |
| $Ti^{4+} + W^{6+}$(cat. %) | 2.13 | 2.13 | 2.14 | 2.13 | 2.13 | 2.13 |
| $Nb^{5+} + Ta^{5+}$(cat. %) | 16.13 | 16.13 | 16.20 | 14.13 | 14.13 | 15.13 |
| $Ti^{4+} + Nb^{5+} + Ta^{5+} + W^{6+}$(cat. %) | 18.26 | 18.26 | 18.34 | 16.26 | 16.26 | 17.26 |
| $(Si^{4+} + B^{3+})/(La^{3+} + Gd^{3+} + Y^{3+})$ | 2.72 | 2.78 | 2.72 | 2.41 | 2.41 | 2.78 |
| $(Si^{4+} + B^{3+})/(Ti^{4+} + Nb^{5+} + Ta^{5+} + W^{6+})$ | 2.35 | 2.40 | 2.35 | 2.64 | 2.64 | 2.54 |
| $Zn^{2+}/(Mg^{2+} + Ca^{2+} + Sr^{2+} + Ba^{2+} + Zn^{2+})$ | 1.00 | 1.00 | 1.00 | 1.00 | 1.00 | 1.00 |
| $(La^{3+} + Gd^{3+} + Y^{3+})/(Ti^{4+} + Nb^{5+} + Ta^{5+} + W^{6+})$ | 0.86 | 0.86 | 0.86 | 1.09 | 1.09 | 0.91 |
| $(Nb^{5+} + Ta^{5+})/(Ti^{4+} + Nb^{5+} + Ta^{5+} + W^{6+})$ | 0.88 | 0.88 | 0.88 | 0.87 | 0.87 | 0.88 |

TABLE 4-5

| | No. | | | | | |
|---|---|---|---|---|---|---|
| | 25 | 26 | 27 | 28 | 29 | 30 |
| $Si^{4+}$(cat. %) | 3.83 | 3.83 | 3.83 | 3.83 | 3.83 | 3.83 |
| $B^{3+}$(cat. %) | 40.04 | 40.04 | 40.29 | 40.04 | 40.04 | 38.04 |
| $Li^{+}$(cat. %) | 0.00 | 0.00 | 0.00 | 0.00 | 0.00 | 0.00 |
| $Na^{+}$(cat. %) | 0.00 | 0.00 | 0.00 | 0.00 | 0.00 | 0.00 |
| $K^{+}$(cat. %) | 0.00 | 0.00 | 0.00 | 0.00 | 0.00 | 0.00 |
| $Mg^{2+}$(cat. %) | 0.00 | 0.00 | 0.00 | 0.00 | 0.00 | 0.00 |
| $Ca^{2+}$(cat. %) | 0.00 | 0.00 | 0.00 | 0.00 | 0.00 | 0.00 |
| $Sr^{2+}$(cat. %) | 0.00 | 0.00 | 0.00 | 0.00 | 0.00 | 0.00 |
| $Ba^{2+}$(cat. %) | 0.00 | 0.00 | 0.00 | 0.00 | 0.00 | 0.00 |
| $Zn^{2+}$(cat. %) | 20.77 | 20.27 | 20.27 | 20.27 | 19.27 | 20.27 |
| $La^{3+}$(cat. %) | 15.77 | 15.77 | 15.77 | 15.77 | 16.77 | 15.77 |
| $Gd^{3+}$(cat. %) | 0.00 | 0.00 | 0.00 | 0.00 | 0.00 | 0.00 |
| $Y^{3+}$(cat. %) | 0.00 | 0.00 | 0.00 | 0.00 | 0.00 | 0.00 |
| $Yb^{3+}$(cat. %) | 0.00 | 0.00 | 0.00 | 0.00 | 0.00 | 0.00 |
| $Zr^{4+}$(cat. %) | 2.33 | 2.33 | 2.33 | 2.33 | 2.33 | 2.33 |
| $Ti^{4+}$(cat. %) | 1.33 | 1.33 | 1.33 | 0.83 | 1.33 | 1.33 |
| $Nb^{5+}$(cat. %) | 10.98 | 11.48 | 11.23 | 11.98 | 11.48 | 13.48 |
| $Ta^{5+}$(cat. %) | 4.15 | 4.15 | 4.15 | 4.15 | 4.15 | 4.15 |
| $W^{6+}$(cat. %) | 0.80 | 0.80 | 0.80 | 0.80 | 0.80 | 0.80 |
| $Te^{4+}$(cat. %) | 0.00 | 0.00 | 0.00 | 0.00 | 0.00 | 0.00 |
| $Ge^{4+}$(cat. %) | 0.00 | 0.00 | 0.00 | 0.00 | 0.00 | 0.00 |
| $Bi^{3+}$(cat. %) | 0.00 | 0.00 | 0.00 | 0.00 | 0.00 | 0.00 |
| $Al^{3+}$(cat. %) | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$(cat. %) | 43.87 | 43.87 | 44.12 | 43.87 | 43.87 | 41.87 |
| $Mg^{2+} + Ca^{2+} + Sr^{2+} + Ba^{2+} + Zn^{2+}$(cat. %) | 20.77 | 20.27 | 20.27 | 20.27 | 19.27 | 20.27 |
| $La^{3+} + Gd^{3+} + Y^{3+}$(cat. %) | 15.77 | 15.77 | 15.77 | 15.77 | 16.77 | 15.77 |
| $Ti^{4+} + W^{6+}$(cat. %) | 2.13 | 2.13 | 2.13 | 1.63 | 2.13 | 2.13 |
| $Nb^{5+} + Ta^{5+}$(cat. %) | 15.13 | 15.63 | 15.38 | 16.13 | 15.63 | 17.63 |
| $Ti^{4+} + Nb^{5+} + Ta^{5+} + W^{6+}$(cat. %) | 17.26 | 17.76 | 17.51 | 17.76 | 17.76 | 19.76 |
| $(Si^{4+} + B^{3+})/(La^{3+} + Gd^{3+} + Y^{3+})$ | 2.78 | 2.78 | 2.80 | 2.78 | 2.62 | 2.66 |
| $(Si^{4+} + B^{3+})/(Ti^{4+} + Nb^{5+} + Ta^{5+} + W^{6+})$ | 2.54 | 2.47 | 2.52 | 2.47 | 2.47 | 2.12 |
| $Zn^{2+}/(Mg^{2+} + Ca^{2+} + Sr^{2+} + Ba^{2+} + Zn^{2+})$ | 1.00 | 1.00 | 1.00 | 1.00 | 1.00 | 1.00 |
| $(La^{3+} + Gd^{3+} + Y^{3+})/(Ti^{4+} + Nb^{5+} + Ta^{5+} + W^{6+})$ | 0.91 | 0.89 | 0.90 | 0.89 | 0.94 | 0.80 |
| $(Nb^{5+} + Ta^{5+})/(Ti^{4+} + Nb^{5+} + Ta^{5+} + W^{6+})$ | 0.88 | 0.88 | 0.88 | 0.91 | 0.88 | 0.89 |

TABLE 4-6

| | No. | | | | | |
|---|---|---|---|---|---|---|
| | 31 | 32 | 33 | 34 | 35 | 36 |
| $Si^{4+}$ (cat. %) | 3.83 | 3.83 | 3.83 | 2.41 | 2.41 | 2.41 |
| $B^{3+}$ (cat. %) | 36.04 | 41.04 | 35.04 | 40.18 | 40.19 | 40.19 |
| $Li^{+}$ (cat. %) | 0.00 | 0.00 | 0.00 | 0.00 | 0.00 | 0.00 |
| $Na^{+}$ (cat. %) | 0.00 | 0.00 | 0.00 | 0.00 | 0.00 | 0.00 |
| $K^{+}$ (cat. %) | 0.00 | 0.00 | 0.00 | 0.00 | 0.00 | 0.00 |
| $Mg^{2+}$ (cat. %) | 0.00 | 0.00 | 0.00 | 0.00 | 0.00 | 0.00 |
| $Ca^{2+}$ (cat. %) | 0.00 | 0.00 | 0.00 | 0.00 | 0.00 | 0.00 |
| $Sr^{2+}$ (cat. %) | 0.00 | 0.00 | 0.00 | 0.00 | 0.00 | 0.00 |
| $Ba^{2+}$ (cat. %) | 0.00 | 0.00 | 0.00 | 0.00 | 0.00 | 0.00 |
| $Zn^{2+}$ (cat. %) | 20.27 | 16.27 | 20.27 | 19.66 | 19.66 | 19.66 |
| $La^{3+}$ (cat. %) | 15.77 | 19.77 | 15.77 | 19.31 | 20.06 | 19.06 |
| $Gd^{3+}$ (cat. %) | 0.00 | 0.00 | 0.00 | 0.76 | 0.00 | 0.00 |
| $Y^{3+}$ (cat. %) | 0.00 | 0.00 | 0.00 | 0.00 | 0.00 | 1.00 |
| $Yb^{3+}$ (cat. %) | 0.00 | 0.00 | 0.00 | 0.00 | 0.00 | 0.00 |
| $Zr^{4+}$ (cat. %) | 2.33 | 2.33 | 2.33 | 2.54 | 2.54 | 2.54 |
| $Ti^{4+}$ (cat. %) | 1.33 | 1.33 | 1.33 | 0.66 | 0.66 | 0.66 |
| $Nb^{5+}$ (cat. %) | 15.48 | 10.48 | 16.48 | 6.74 | 6.74 | 6.74 |
| $Ta^{5+}$ (cat. %) | 4.15 | 4.15 | 4.15 | 4.83 | 4.83 | 4.83 |
| $W^{6+}$ (cat. %) | 0.80 | 0.80 | 0.80 | 2.91 | 2.91 | 2.91 |
| $Te^{4+}$ (cat. %) | 0.00 | 0.00 | 0.00 | 0.00 | 0.00 | 0.00 |
| $Ge^{4+}$ (cat. %) | 0.00 | 0.00 | 0.00 | 0.00 | 0.00 | 0.00 |
| $Bi^{3+}$ (cat. %) | 0.00 | 0.00 | 0.00 | 0.00 | 0.00 | 0.00 |
| $Al^{3+}$ (cat. %) | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ (cat. %) | 39.87 | 44.87 | 38.87 | 42.59 | 42.60 | 42.60 |
| $Mg^{2+} + Ca^{2+} + Sr^{2+} + Ba^{2+} + Zn^{2+}$ (cat. %) | 20.27 | 16.27 | 20.27 | 19.66 | 19.66 | 19.66 |
| $La^{3+} + Gd^{3+} + Y^{3+}$ (cat. %) | 15.77 | 19.77 | 15.77 | 20.07 | 20.06 | 20.06 |
| $Ti^{4+} + W^{6+}$ (cat. %) | 2.13 | 2.13 | 2.13 | 3.57 | 3.57 | 3.57 |
| $Nb^{5+} + Ta^{5+}$ (cat. %) | 19.63 | 14.63 | 20.63 | 11.57 | 11.57 | 11.57 |
| $Ti^{4+} + Nb^{5+} + Ta^{5+} + W^{6+}$ (cat. %) | 21.76 | 16.76 | 22.76 | 15.14 | 15.14 | 15.14 |
| $(Si^{4+} + B^{3+})/(La^{3+} + Gd^{3+} + Y^{3+})$ | 2.53 | 2.27 | 2.46 | 2.12 | 2.12 | 2.12 |
| $(Si^{4+} + B^{3+})/(Ti^{4+} + Nb^{5+} + Ta^{5+} + W^{6+})$ | 1.83 | 2.68 | 1.71 | 2.81 | 2.81 | 2.81 |
| $Zn^{2+}/(Mg^{2+} + Ca^{2+} + Sr^{2+} + Ba^{2+} + Zn^{2+})$ | 1.00 | 1.00 | 1.00 | 1.00 | 1.00 | 1.00 |
| $(La^{3+} + Gd^{3+} + Y^{3+})/(Ti^{4+} + Nb^{5+} + Ta^{5+} + W^{6+})$ | 0.72 | 1.18 | 0.69 | 1.33 | 1.32 | 1.32 |
| $(Nb^{5+} + Ta^{5+})/(Ti^{4+} + Nb^{5+} + Ta^{5+} + W^{6+})$ | 0.90 | 0.87 | 0.91 | 0.76 | 0.76 | 0.76 |

TABLE 4-7

| | No. | | | | | |
|---|---|---|---|---|---|---|
| | 37 | 38 | 39 | 40 | 41 | 42 |
| $Si^{4+}$ (cat. %) | 5.83 | 2.41 | 2.41 | 2.41 | 2.41 | 2.41 |
| $B^{3+}$ (cat. %) | 32.04 | 40.19 | 40.19 | 40.19 | 40.19 | 40.19 |
| $Li^{+}$ (cat. %) | 0.00 | 0.00 | 0.00 | 0.00 | 0.00 | 0.00 |
| $Na^{+}$ (cat. %) | 0.00 | 0.00 | 0.00 | 0.00 | 0.00 | 0.00 |
| $K^{+}$ (cat. %) | 0.00 | 0.00 | 0.00 | 0.00 | 0.00 | 0.00 |
| $Mg^{2+}$ (cat. %) | 0.00 | 0.00 | 0.00 | 0.00 | 0.00 | 0.00 |
| $Ca^{2+}$ (cat. %) | 0.00 | 0.00 | 0.00 | 0.00 | 0.00 | 0.00 |
| $Sr^{2+}$ (cat. %) | 0.00 | 0.00 | 0.00 | 0.00 | 0.00 | 0.00 |
| $Ba^{2+}$ (cat. %) | 0.00 | 0.00 | 0.00 | 0.00 | 0.00 | 0.00 |
| $Zn^{2+}$ (cat. %) | 18.27 | 19.66 | 19.66 | 19.66 | 19.66 | 19.66 |
| $La^{3+}$ (cat. %) | 15.77 | 20.06 | 20.06 | 19.56 | 19.56 | 20.06 |
| $Gd^{3+}$ (cat. %) | 0.00 | 0.00 | 0.00 | 0.00 | 0.00 | 0.00 |
| $Y^{3+}$ (cat. %) | 0.00 | 0.00 | 0.00 | 0.00 | 0.00 | 0.00 |
| $Yb^{3+}$ (cat. %) | 0.00 | 0.00 | 0.00 | 0.00 | 0.00 | 0.00 |
| $Zr^{4+}$ (cat. %) | 2.33 | 2.54 | 2.54 | 2.54 | 2.54 | 2.54 |
| $Ti^{4+}$ (cat. %) | 1.33 | 0.66 | 0.66 | 0.66 | 0.66 | 0.66 |
| $Nb^{5+}$ (cat. %) | 19.48 | 4.74 | 3.74 | 5.74 | 6.24 | 4.74 |
| $Ta^{5+}$ (cat. %) | 4.15 | 6.83 | 7.83 | 6.33 | 5.83 | 7.83 |
| $W^{6+}$ (cat. %) | 0.80 | 2.91 | 2.91 | 2.91 | 2.91 | 1.91 |
| $Te^{4+}$ (cat. %) | 0.00 | 0.00 | 0.00 | 0.00 | 0.00 | 0.00 |
| $Ge^{4+}$ (cat. %) | 0.00 | 0.00 | 0.00 | 0.00 | 0.00 | 0.00 |
| $Bi^{3+}$ (cat. %) | 0.00 | 0.00 | 0.00 | 0.00 | 0.00 | 0.00 |
| $Al^{3+}$ (cat. %) | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ (cat. %) | 37.87 | 42.60 | 42.60 | 42.60 | 42.60 | 42.60 |
| $Mg^{2+} + Ca^{2+} + Sr^{2+} + Ba^{2+} + Zn^{2+}$ (cat. %) | 18.27 | 19.66 | 19.66 | 19.66 | 19.66 | 19.66 |
| $La^{3+} + Gd^{3+} + Y^{3+}$ (cat. %) | 15.77 | 20.06 | 20.06 | 19.56 | 19.56 | 20.06 |
| $Ti^{4+} + W^{6+}$ (cat. %) | 2.13 | 3.57 | 3.57 | 3.57 | 3.57 | 2.57 |

TABLE 4-7-continued

| | No. | | | | | |
|---|---|---|---|---|---|---|
| | 37 | 38 | 39 | 40 | 41 | 42 |
| $Nb^{5+} + Ta^{5+}$ (cat. %) | 23.63 | 11.57 | 11.57 | 12.07 | 12.07 | 12.57 |
| $Ti^{4+} + Nb^{5+} + Ta^{5+} + W^{6+}$ (cat. %) | 25.76 | 15.14 | 15.14 | 15.64 | 15.64 | 15.14 |
| $(Si^{4+} + B^{3+})/(La^{3+} + Gd^{3+} + Y^{3+})$ | 2.40 | 2.12 | 2.12 | 2.18 | 2.18 | 2.12 |
| $(Si^{4+} + B^{3+})/(Ti^{4+} + Nb^{5+} + Ta^{5+} + W^{6+})$ | 1.47 | 2.81 | 2.81 | 2.72 | 2.72 | 2.81 |
| $Zn^{2+}/(Mg^{2+} + Ca^{2+} + Sr^{2+} + Ba^{2+} + Zn^{2+})$ | 1.00 | 1.00 | 1.00 | 1.00 | 1.00 | 1.00 |
| $(La^{3+} + Gd^{3+} + Y^{3+})/(Ti^{4+} + Nb^{5+} + Ta^{5+} + W^{6+})$ | 0.61 | 1.32 | 1.32 | 1.25 | 1.25 | 1.32 |
| $(Nb^{5+} + Ta^{5+})/(Ti^{4+} + Nb^{5+} + Ta^{5+} + W^{6+})$ | 0.92 | 0.76 | 0.76 | 0.77 | 0.77 | 0.83 |

TABLE 4-8

| | No. | | | | | |
|---|---|---|---|---|---|---|
| | 43 | 44 | 45 | 46 | 47 | 48 |
| $Si^{4+}$ (cat. %) | 2.41 | 3.83 | 3.88 | 4.83 | 4.37 | 4.27 |
| $B^{3+}$ (cat. %) | 40.19 | 34.05 | 41.29 | 39.05 | 40.46 | 40.47 |
| $Li^+$ (cat. %) | 0.00 | 0.00 | 0.00 | 0.00 | 0.00 | 0.00 |
| $Na^+$ (cat. %) | 0.00 | 0.00 | 0.00 | 0.00 | 0.00 | 0.00 |
| $K^+$ (cat. %) | 0.00 | 0.00 | 0.00 | 0.00 | 0.00 | 0.00 |
| $Mg^{2+}$ (cat. %) | 0.00 | 0.00 | 0.00 | 0.00 | 0.00 | 0.00 |
| $Ca^{2+}$ (cat. %) | 0.00 | 0.00 | 0.00 | 0.00 | 0.00 | 0.00 |
| $Sr^{2+}$ (cat. %) | 0.00 | 0.00 | 0.00 | 0.00 | 0.00 | 0.00 |
| $Ba^{2+}$ (cat. %) | 0.00 | 0.00 | 0.00 | 0.00 | 0.00 | 0.00 |
| $Zn^{2+}$ (cat. %) | 19.66 | 20.27 | 18.51 | 20.27 | 18.96 | 19.46 |
| $La^{3+}$ (cat. %) | 20.06 | 15.76 | 15.98 | 15.76 | 15.93 | 15.93 |
| $Gd^{3+}$ (cat. %) | 0.00 | 0.00 | 0.00 | 0.00 | 0.00 | 0.00 |
| $Y^{3+}$ (cat. %) | 0.00 | 0.00 | 0.00 | 0.00 | 0.00 | 0.00 |
| $Yb^{3+}$ (cat. %) | 0.00 | 0.00 | 0.00 | 0.00 | 0.00 | 0.00 |
| $Zr^{4+}$ (cat. %) | 2.54 | 2.33 | 2.36 | 2.33 | 2.35 | 2.35 |
| $Ti^{4+}$ (cat. %) | 0.66 | 3.33 | 0.00 | 1.33 | 1.34 | 1.74 |
| $Nb^{5+}$ (cat. %) | 3.74 | 15.48 | 13.77 | 11.48 | 11.59 | 11.59 |
| $Ta^{5+}$ (cat. %) | 8.83 | 4.15 | 4.21 | 4.15 | 4.19 | 4.19 |
| $W^{6+}$ (cat. %) | 1.91 | 0.80 | 0.00 | 0.80 | 0.81 | 0.00 |
| $Te^{4+}$ (cat. %) | 0.00 | 0.00 | 0.00 | 0.00 | 0.00 | 0.00 |
| $Ge^{4+}$ (cat. %) | 0.00 | 0.00 | 0.00 | 0.00 | 0.00 | 0.00 |
| $Bi^{3+}$ (cat. %) | 0.00 | 0.00 | 0.00 | 0.00 | 0.00 | 0.00 |
| $Al^{3+}$ (cat. %) | 0.00 | 0.00 | 0.00 | 0.00 | 0.00 | 0.00 |
| Total | 100.00 | 100.00 | 100.00 | 100.00 | 100.00 | 100.00 |
| $Si^{4+} + B^{3+}$ (cat. %) | 42.60 | 37.88 | 45.17 | 43.88 | 44.83 | 44.74 |
| $Mg^{2+} + Ca^{2+} + Sr^{2+} + Ba^{2+} + Zn^{2+}$ (cat. %) | 19.66 | 20.27 | 18.51 | 20.27 | 18.96 | 19.46 |
| $La^{3+} + Gd^{3+} + Y^{3+}$ (cat. %) | 20.06 | 15.76 | 15.98 | 15.76 | 15.93 | 15.93 |
| $Ti^{4+} + W^{6+}$ (cat. %) | 2.57 | 4.13 | 0.00 | 2.13 | 2.15 | 1.74 |
| $Nb^{5+} + Ta^{5+}$ (cat. %) | 12.57 | 19.63 | 17.98 | 15.63 | 15.78 | 15.78 |
| $Ti^{4+} + Nb^{5+} + Ta^{5+} + W^{6+}$ (cat. %) | 15.14 | 23.76 | 17.98 | 17.76 | 17.93 | 17.52 |
| $(Si^{4+} + B^{3+})/(La^{3+} + Gd^{3+} + Y^{3+})$ | 2.12 | 2.40 | 2.83 | 2.78 | 2.81 | 2.81 |
| $(Si^{4+} + B^{3+})/(Ti^{4+} + Nb^{5+} + Ta^{5+} + W^{6+})$ | 2.81 | 1.59 | 2.51 | 2.47 | 2.50 | 2.55 |
| $Zn^{2+}/(Mg^{2+} + Ca^{2+} + Sr^{2+} + Ba^{2+} + Zn^{2+})$ | 1.00 | 1.00 | 1.00 | 1.00 | 1.00 | 1.00 |
| $(La^{3+} + Gd^{3+} + Y^{3+})/(Ti^{4+} + Nb^{5+} + Ta^{5+} + W^{6+})$ | 1.32 | 0.66 | 0.89 | 0.89 | 0.89 | 0.91 |
| $(Nb^{5+} + Ta^{5+})/(Ti^{4+} + Nb^{5+} + Ta^{5+} + W^{6+})$ | 0.83 | 0.83 | 1.00 | 0.88 | 0.88 | 0.90 |

TABLE 4-9

| No. | 49 | 50 | 51 |
|---|---|---|---|
| $Si^{4+}$ (cat. %) | 4.08 | 4.13 | 5.08 |
| $B^{3+}$ (cat. %) | 40.05 | 40.59 | 39.55 |
| $Li^+$ (cat. %) | 0.00 | 0.00 | 0.00 |
| $Na^+$ (cat %) | 0.00 | 0.00 | 0.00 |
| $K^+$ (cat. %) | 0.00 | 0.00 | 0.00 |
| $Mg^{2+}$ (cat. %) | 0.00 | 0.00 | 0.00 |
| $Ca^{2+}$ (cat. %) | 0.00 | 0.00 | 0.00 |
| $Sr^{2+}$ (cat. %) | 0.00 | 0.00 | 0.00 |
| $Ba^{2+}$ (cat. %) | 0.00 | 0.00 | 0.00 |
| $Zn^{2+}$ (cat %) | 19.27 | 18.26 | 19.02 |
| $La^{3+}$ (cat %) | 15.76 | 15.98 | 15.76 |
| $Gd^{3+}$ (cat %) | 0.00 | 0.00 | 0.00 |
| $Y^{3+}$ (cat %) | 0.00 | 0.00 | 0.00 |
| $Yb^{3+}$ (cat %) | 0.00 | 0.00 | 0.00 |
| $Zr^{4+}$ (cat %) | 3.08 | 2.36 | 2.33 |
| $Ti^{4+}$ (cat. %) | 1.33 | 0.00 | 1.33 |
| $Nb^{5+}$ (cat. %) | 11.48 | 11.63 | 11.98 |
| $Ta^{5+}$ (cat. %) | 4.15 | 4.21 | 4.15 |
| $W^{6+}$ (cat %) | 0.80 | 2.84 | 0.80 |
| $Te^{4+}$ (cat %) | 0.00 | 0.00 | 0.00 |
| $Ge^{4+}$ (cat. %) | 0.00 | 0.00 | 0.00 |
| $Bi^{3+}$ (cat. %) | 0.00 | 0.00 | 0.00 |
| $Al^{3+}$ (cat. %) | 0.00 | 0.00 | 0.00 |
| Total | 100.00 | 100.00 | 100.00 |
| $Si^{4+} + B^{3+}$ (cat. %) | 44.13 | 44.72 | 44.63 |
| $Mg^{2+} + Ca^{2+} + Sr^{2+} + Ba^{2+} + Zn^{2+}$ (cat. %) | 19.27 | 18.26 | 19.02 |
| $La^{3+} + Gd^{3+} + Y^{3+}$ (cat. %) | 15.76 | 15.98 | 15.76 |
| $Ti^{4+} + W^{6+}$ (cat. %) | 2.13 | 2.84 | 2.13 |
| $Nb^{5+} + Ta^{5+}$ (cat. %) | 15.63 | 15.84 | 16.13 |
| $Ti^{4+} + Nb^{5+} + Ta^{5+} + W^{6+}$ (cat. %) | 17.76 | 18.68 | 18.26 |

TABLE 4-9-continued

| No. | 49 | 50 | 51 |
|---|---|---|---|
| $(Si^{4+} + B^{3+})/(La^{3+} + Gd^{3+} + Y^{3+})$ | 2.80 | 2.80 | 2.83 |
| $(Si^{4+} + B^{3+})/(Ti^{4+} + Nb^{5+} + Ta^{5+} + W^{6+})$ | 2.48 | 2.39 | 2.44 |
| $Zn^{2+}/(Mg^{2+} + Ca^{2+} + Sr^{2+} + Ba^{2+} + Zn^{2+})$ | 1.00 | 1.00 | 1.00 |
| $(La^{3+} + Gd^{3+} + Y^{3+})/(Ti^{4+} + Nb^{5+} + Ta^{5+} + W^{6+})$ | 0.89 | 0.86 | 0.86 |
| $(Nb^{5+} + Ta^{5+})/(Ti^{4+} + Nb^{5+} + Ta^{5+} + W^{6+})$ | 0.88 | 0.85 | 0.88 |

TABLE 5-1

| | No. | | | | | | |
|---|---|---|---|---|---|---|---|
| | 1 | 2 | 3 | 4 | 5 | 6 | 7 |
| nd | 1.91273 | 1.91266 | 1.91713 | 1.91999 | 1.91033 | 1.90948 | 1.90709 |
| νd | 31.00 | 31.29 | 31.34 | 30.78 | 32.59 | 32.60 | 32.62 |
| $P_{g,F}$ | 0.59205 | 0.59239 | 0.59057 | 0.59284 | 0.58718 | 0.58674 | 0.58792 |
| $\Delta P_{g,F}$ | −0.0005 | 0.0004 | −0.0013 | −0.0001 | −0.0025 | −0.0029 | −0.0017 |
| Specific gravity | 4.79 | 4.99 | 4.93 | 4.82 | 5.00 | 5.03 | 4.96 |
| Tg (° C.) | 592 | 593 | 593 | 590 | 594 | 596 | 597 |
| Ts (° C.) | 632 | 633 | 633 | 630 | 635 | 637 | 637 |
| Liquidus temperature (° C.) | 1200 or less | 1060 or less | 1060 or less | 1070 or less | 1200 or less | 1200 or less | 1200 or less |
| λ70 (nm) | 405 | 408 | 403 | 408 | 395 | 395 | 394 |
| λ5 (nm) | 353 | 357 | 353 | 356 | 350 | 350 | 350 |

TABLE 5-2

| | No. | | | | | | |
|---|---|---|---|---|---|---|---|
| | 8 | 9 | 10 | 11 | 12 | 13 | 14 |
| nd | 1.91158 | 1.91139 | 1.91071 | 1.91381 | 1.91257 | 1.91272 | 1.90916 |
| νd | 31.77 | 32.09 | 31.90 | 32.03 | 31.82 | 31.92 | 32.01 |
| $P_{g,F}$ | 0.58557 | 0.59049 | 0.59019 | 0.58675 | 0.58647 | 0.58797 | 0.58908 |
| $\Delta P_{g,F}$ | −0.0055 | 0.0000 | −0.0007 | −0.0039 | −0.0046 | −0.0029 | −0.0016 |
| Specific gravity | 4.94 | 4.92 | 4.85 | 4.95 | 4.93 | 4.94 | 4.91 |
| Tg (° C.) | 590 | 592 | 588 | 586 | 590 | 589 | 587 |
| Ts (° C.) | 632 | 631 | 620 | 625 | 631 | 631 | 628 |
| Liquidus temperature (° C.) | 1060 or less | 1150 or less | 1150 or less | 1100 or less | 1100 or less | 1100 or less | 1080 or less |
| λ70 (nm) | 405 | 403 | 405 | 404 | 404 | 405 | 406 |
| λ5 (nm) | 352 | 350 | 350 | 349 | 351 | 351 | 351 |

TABLE 5-3

| | No. | | | | | | |
|---|---|---|---|---|---|---|---|
| | 15 | 16 | 17 | 18 | 19 | 20 | 21 |
| nd | 1.90593 | 1.90876 | 1.90767 | 1.91131 | 1.90407 | 1.90463 | 1.90739 |
| νd | 32.25 | 32.03 | 31.94 | 31.81 | 32.88 | 31.99 | 31.94 |
| $P_{g,F}$ | 0.58811 | 0.59217 | 0.58691 | 0.58604 | 0.58691 | 0.58699 | 0.58993 |
| $\Delta P_{g,F}$ | −0.0021 | 0.0015 | −0.0039 | −0.0050 | −0.0022 | −0.0037 | −0.0009 |
| Specific gravity | 4.91 | 4.90 | 4.90 | 4.93 | 5.10 | 4.87 | 4.89 |
| Tg (° C.) | 586 | 594 | 595 | 591 | 599 | 598 | 596 |
| Ts (° C.) | 628 | 637 | 637 | 634 | 644 | 641 | 640 |
| Liquidus temperature (° C.) | 1100 or less | 1060 or less | 1060 or less | 1080 or less | 1200 or less | 1060 or less | 1080 or less |
| λ70 (nm) | 403 | 405 | 404 | 402 | 398 | 403 | 403 |
| λ5 (nm) | 350 | 351 | 351 | 351 | 349 | 351 | 351 |

TABLE 5-4

| | No. | | | | | | |
|---|---|---|---|---|---|---|---|
| | 22 | 23 | 24 | 25 | 26 | 27 | 28 |
| nd | 1.90259 | 1.90498 | 1.90071 | 1.90132 | 1.90426 | 1.90220 | 1.90399 |
| νd | 33.17 | 32.81 | 32.50 | 32.36 | 32.11 | 32.30 | 32.24 |
| $P_{g,F}$ | 0.58471 | 0.58811 | 0.58715 | 0.58707 | 0.58807 | 0.58861 | 0.58951 |
| $\Delta P_{g,F}$ | −0.0039 | −0.0011 | −0.0027 | −0.0030 | −0.0024 | −0.0016 | −0.0008 |

TABLE 5-4-continued

| | No. | | | | | | |
|---|---|---|---|---|---|---|---|
| | 22 | 23 | 24 | 25 | 26 | 27 | 28 |
| Specific gravity | 4.97 | 4.87 | 4.89 | 4.86 | 4.86 | 4.85 | 4.86 |
| Tg (° C.) | 595 | 592 | 593 | 594 | 593 | 593 | 594 |
| Ts (° C.) | 638 | 634 | 635 | 635 | 637 | 636 | 636 |
| Liquidus temperature (° C.) | 1200 or less | 1200 or less | 1050 or less | 1045 or less | 1045 or less | 1045 or less | 1080 or less |
| λ70 (nm) | 397 | 400 | 401 | 402 | 404 | 403 | 401 |
| λ5 (nm) | 348 | 349 | 350 | 350 | 351 | 351 | 349 |

TABLE 5-5

| | No. | | | | | | |
|---|---|---|---|---|---|---|---|
| | 29 | 30 | 31 | 32 | 33 | 34 | 35 |
| nd | 1.90673 | 1.92087 | 1.93800 | 1.90599 | 1.94653 | 1.90115 | 1.90138 |
| vd | 32.26 | 31.06 | 30.01 | 33.20 | 29.52 | 34.10 | 34.10 |
| $P_{g,F}$ | 0.58876 | 0.59292 | 0.59405 | 0.58446 | 0.59451 | 0.58305 | 0.58381 |
| $\Delta P_{g,F}$ | −0.0015 | 0.0005 | −0.0002 | −0.0041 | −0.0007 | −0.0039 | −0.0031 |
| Specific gravity | 4.88 | 4.89 | 4.93 | 4.94 | 4.96 | 5.16 | 5.15 |
| Tg (° C.) | 597 | 593 | 593 | 608 | 593 | 597 | 596 |
| Ts (° C.) | 639 | 637 | 636 | 651 | 636 | 639 | 639 |
| Liquidus temperature (° C.) | 1080 or less | 1080 or less | 1100 or less | 1200 or less | 1100 or less | 1150 or less | 1100 or less |
| λ70 (nm) | 401 | 409 | 416 | 399 | 420 | 395 | 394 |
| λ5 (nm) | 350 | 352 | 355 | 348 | 355 | 350 | 349 |

TABLE 5-6

| | No. | | | | | | |
|---|---|---|---|---|---|---|---|
| | 36 | 37 | 38 | 39 | 40 | 41 | 42 |
| nd | 1.89982 | 1.96119 | 1.89871 | 1.89715 | 1.90108 | 1.90153 | 1.89902 |
| vd | 34.16 | 28.40 | 34.63 | 34.96 | 34.22 | 34.06 | 34.89 |
| $P_{g,F}$ | 0.58580 | 0.59870 | 0.58227 | 0.58457 | 0.58602 | 0.58481 | 0.58246 |
| $\Delta P_{g,F}$ | −0.0010 | 0.0015 | −0.0037 | −0.0008 | −0.0007 | −0.0022 | −0.0030 |
| Specific gravity | 5.13 | 4.94 | 5.24 | 5.29 | 5.21 | 5.18 | 5.26 |
| Tg (° C.) | 598 | 600 | 601 | 601 | 599 | 598 | 603 |
| Ts (° C.) | 640 | 644 | 643 | 644 | 640 | 639 | 645 |
| Liquidus temperature (° C.) | 1150 or less | 1150 or less | 1090 or less | 1130 or less | 1100 or less | 1100 or less | 1150 or less |
| λ70 (nm) | 393 | 456 | 392 | 391 | 395 | 394 | 395 |
| λ5 (nm) | 350 | 361 | 349 | 349 | 349 | 350 | 346 |

TABLE 5-7

| | No. | | | | | | |
|---|---|---|---|---|---|---|---|
| | 43 | 44 | 45 | 46 | 47 | 48 | 49 |
| nd | 1.89768 | 1.95518 | 1.90297 | 1.90090 | 1.90126 | 1.90110 | 1.90504 |
| vd | 35.12 | 28.88 | 32.40 | 32.24 | 31.19 | 32.29 | 32.12 |
| $P_{g,F}$ | 0.58020 | 0.59903 | 0.59096 | 0.58805 | 0.58893 | 0.58760 | 0.58801 |
| $\Delta P_{g,F}$ | −0.0049 | 0.0027 | 0.0010 | −0.0022 | −0.0032 | −0.0026 | −0.0025 |
| Specific gravity | 5.31 | 4.95 | 4.81 | 4.84 | 4.83 | 4.80 | 4.84 |
| Tg (° C.) | 603 | 593 | 599 | 597 | 600 | 598 | 598 |
| Ts (° C.) | 645 | 639 | 640 | 641 | 643 | 642 | 641 |
| Liquidus temperature (° C.) | 1150 or less | 1100 or less | 1100 or less | 1050 or less | 1050 or less | 1050 or less | 1090 or less |
| λ70 (nm) | 388 | 429 | 396 | 402 | 401 | 402 | 400 |
| λ5 (nm) | 346 | 360 | 341 | 351 | 351 | 349 | 351 |

TABLE 5-8

| No. | 50 | 51 |
|---|---|---|
| nd | 1.90075 | 1.90138 |
| νd | 32.20 | 32.01 |
| $P_{g,F}$ | 0.59385 | 0.58842 |
| $\Delta P_{g,F}$ | 0.0035 | −0.0023 |
| Specific gravity | 4.91 | 4.81 |
| Tg(° C.) | 598 | 600 |
| Ts(° C.) | 641 | 645 |
| Liquidus temperature (° C.) | 1050 or less | 1050 or less |
| λ 70(nm) | 400 | 399 |
| λ 5(nm) | 353 | 352 |

TABLE 6-1

| | No. | | | | | | |
|---|---|---|---|---|---|---|---|
| | 1 | 2 | 3 | 4 | 5 | 6 | 7 |
| $SiO_2$ (wt. %) | 1.61 | 1.52 | 1.55 | 1.59 | 1.53 | 1.53 | 1.55 |
| $B_2O_3$ (wt. %) | 16.89 | 15.36 | 15.61 | 16.02 | 15.51 | 15.45 | 15.68 |
| $Li_2O$ (wt. %) | 0.00 | 0.00 | 0.00 | 0.00 | 0.00 | 0.00 | 0.00 |
| $Na_2O$ (wt. %) | 0.00 | 0.00 | 0.00 | 0.00 | 0.00 | 0.00 | 0.00 |
| $K_2O$ (wt. %) | 0.00 | 0.00 | 0.00 | 0.00 | 0.00 | 0.00 | 0.00 |
| MgO (wt. %) | 0.00 | 0.00 | 0.00 | 0.00 | 0.00 | 0.00 | 0.00 |
| CaO (wt. %) | 0.00 | 0.00 | 0.00 | 0.00 | 0.00 | 0.00 | 0.00 |
| SrO (wt. %) | 0.00 | 0.00 | 0.00 | 0.00 | 0.00 | 0.00 | 0.00 |
| BaO (wt. %) | 0.00 | 0.00 | 0.00 | 0.00 | 0.00 | 0.00 | 0.00 |
| ZnO (wt. %) | 18.56 | 17.51 | 17.79 | 18.25 | 17.67 | 17.60 | 17.87 |
| $La_2O_3$ (wt. %) | 26.81 | 27.96 | 28.41 | 29.13 | 31.80 | 28.10 | 28.54 |
| $Gd_2O_3$ (wt. %) | 0.00 | 0.00 | 0.00 | 0.00 | 0.00 | 3.97 | 0.00 |
| $Y_2O_3$ (wt. %) | 0.00 | 0.00 | 0.00 | 0.00 | 0.00 | 0.00 | 2.51 |
| $Yb_2O_3$ (wt. %) | 0.00 | 0.00 | 0.00 | 0.00 | 0.00 | 0.00 | 0.00 |
| $ZrO_2$ (wt. %) | 3.31 | 3.12 | 3.17 | 3.25 | 3.15 | 3.14 | 3.18 |
| $TiO_2$ (wt. %) | 2.14 | 2.02 | 1.17 | 2.11 | 1.16 | 1.16 | 1.18 |
| $Nb_2O_5$ (wt. %) | 18.83 | 12.99 | 17.60 | 19.57 | 14.57 | 14.51 | 14.73 |
| $Ta_2O_5$ (wt. %) | 11.85 | 11.19 | 11.36 | 6.65 | 11.29 | 11.24 | 11.41 |
| $WO_3$ (wt. %) | 0.00 | 8.33 | 3.34 | 3.43 | 3.32 | 3.30 | 3.35 |
| $TeO_2$ (wt. %) | 0.00 | 0.00 | 0.00 | 0.00 | 0.00 | 0.00 | 0.00 |
| $GeO_2$ (wt. %) | 0.00 | 0.00 | 0.00 | 0.00 | 0.00 | 0.00 | 0.00 |
| $Bi_2O_3$ (wt. %) | 0.00 | 0.00 | 0.00 | 0.00 | 0.00 | 0.00 | 0.00 |
| $Al_2O_3$ (wt. %) | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

TABLE 6-2

| | No. | | | | | | |
|---|---|---|---|---|---|---|---|
| | 8 | 9 | 10 | 11 | 12 | 13 | 14 |
| $SiO_2$ (wt. %) | 1.55 | 1.56 | 1.59 | 0.00 | 1.56 | 1.56 | 1.58 |
| $B_2O_3$ (wt. %) | 15.70 | 15.80 | 16.02 | 16.80 | 15.58 | 15.52 | 15.79 |
| $Li_2O$ (wt. %) | 0.00 | 0.00 | 0.00 | 0.00 | 0.00 | 0.00 | 0.00 |
| $Na_2O$ (wt. %) | 0.00 | 0.00 | 0.00 | 0.00 | 0.00 | 0.00 | 0.00 |
| $K_2O$ (wt. %) | 0.00 | 0.00 | 0.00 | 0.00 | 0.00 | 0.00 | 0.00 |
| MgO (wt. %) | 0.00 | 0.00 | 0.00 | 0.00 | 0.00 | 0.00 | 0.00 |
| CaO (wt. %) | 0.00 | 0.00 | 0.00 | 0.00 | 0.31 | 0.00 | 0.00 |
| SrO (wt. %) | 0.00 | 0.00 | 0.00 | 0.00 | 0.00 | 0.00 | 0.00 |
| BaO (wt. %) | 0.00 | 0.00 | 0.00 | 0.00 | 0.00 | 0.00 | 0.00 |
| ZnO (wt. %) | 18.80 | 18.91 | 19.65 | 19.48 | 18.88 | 19.27 | 20.06 |
| $La_2O_3$ (wt. %) | 28.56 | 28.75 | 29.15 | 28.92 | 28.69 | 29.48 | 29.06 |
| $Gd_2O_3$ (wt. %) | 0.00 | 0.00 | 0.00 | 0.00 | 0.00 | 0.00 | 0.00 |
| $Y_2O_3$ (wt. %) | 0.00 | 0.00 | 0.00 | 0.00 | 0.00 | 0.00 | 0.00 |
| $Yb_2O_3$ (wt. %) | 0.00 | 0.00 | 0.00 | 0.00 | 0.00 | 0.00 | 0.00 |
| $ZrO_2$ (wt. %) | 3.19 | 3.90 | 3.25 | 3.23 | 3.20 | 2.50 | 2.55 |
| $TiO_2$ (wt. %) | 1.18 | 1.18 | 0.75 | 0.74 | 1.18 | 1.18 | 1.20 |
| $Nb_2O_5$ (wt. %) | 16.23 | 16.32 | 19.58 | 17.17 | 17.04 | 16.98 | 17.27 |
| $Ta_2O_5$ (wt. %) | 11.43 | 11.50 | 7.90 | 11.57 | 11.48 | 11.44 | 10.38 |
| $WO_3$ (wt. %) | 3.36 | 2.08 | 2.11 | 2.09 | 2.08 | 2.07 | 2.11 |
| $TeO_2$ (wt. %) | 0.00 | 0.00 | 0.00 | 0.00 | 0.00 | 0.00 | 0.00 |
| $GeO_2$ (wt. %) | 0.00 | 0.00 | 0.00 | 0.00 | 0.00 | 0.00 | 0.00 |
| $Bi_2O_3$ (wt. %) | 0.00 | 0.00 | 0.00 | 0.00 | 0.00 | 0.00 | 0.00 |
| $Al_2O_3$ (wt. %) | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

TABLE 6-3

| | No. | | | | | | |
|---|---|---|---|---|---|---|---|
| | 15 | 16 | 17 | 18 | 19 | 20 | 21 |
| $SiO_2$ (wt. %) | 1.59 | 2.56 | 2.89 | 2.55 | 2.46 | 3.24 | 3.23 |
| $B_2O_3$ (wt. %) | 15.90 | 15.14 | 14.93 | 14.68 | 14.57 | 15.18 | 14.78 |
| $Li_2O$ (wt. %) | 0.00 | 0.00 | 0.00 | 0.00 | 0.00 | 0.00 | 0.00 |
| $Na_2O$ (wt. %) | 0.00 | 0.00 | 0.00 | 0.00 | 0.00 | 0.00 | 0.00 |
| $K_2O$ (wt. %) | 0.00 | 0.00 | 0.00 | 0.00 | 0.00 | 0.00 | 0.00 |
| MgO (wt. %) | 0.00 | 0.00 | 0.00 | 0.00 | 0.00 | 0.00 | 0.00 |
| CaO (wt. %) | 0.00 | 0.00 | 0.00 | 0.00 | 0.00 | 0.00 | 0.00 |
| SrO (wt. %) | 0.00 | 0.00 | 0.00 | 0.00 | 0.00 | 0.00 | 0.00 |
| BaO (wt. %) | 0.00 | 0.00 | 0.00 | 0.00 | 0.00 | 0.00 | 0.00 |
| ZnO (wt. %) | 20.21 | 18.82 | 18.80 | 19.63 | 18.11 | 17.96 | 18.40 |
| $La_2O_3$ (wt. %) | 29.30 | 28.61 | 28.55 | 28.45 | 27.54 | 28.66 | 28.65 |
| $Gd_2O_3$ (wt. %) | 0.00 | 0.00 | 0.00 | 0.00 | 0.00 | 0.00 | 0.00 |
| $Y_2O_3$ (wt. %) | 0.00 | 0.00 | 0.00 | 0.00 | 0.00 | 0.00 | 0.00 |
| $Yb_2O_3$ (wt. %) | 0.00 | 0.00 | 0.00 | 0.00 | 0.00 | 0.00 | 0.00 |
| $ZrO_2$ (wt. %) | 2.57 | 3.19 | 3.19 | 3.17 | 3.07 | 3.20 | 3.20 |
| $TiO_2$ (wt. %) | 1.21 | 1.18 | 1.18 | 1.17 | 1.13 | 1.18 | 1.18 |
| $Nb_2O_5$ (wt. %) | 16.64 | 16.99 | 16.96 | 16.90 | 10.65 | 17.03 | 17.02 |
| $Ta_2O_5$ (wt. %) | 10.46 | 11.44 | 11.43 | 11.39 | 20.48 | 11.47 | 11.46 |
| $WO_3$ (wt. %) | 2.12 | 2.07 | 2.07 | 2.06 | 1.99 | 2.08 | 2.08 |
| $TeO_2$ (wt. %) | 0.00 | 0.00 | 0.00 | 0.00 | 0.00 | 0.00 | 0.00 |
| $GeO_2$ (wt. %) | 0.00 | 0.00 | 0.00 | 0.00 | 0.00 | 0.00 | 0.00 |
| $Bi_2O_3$ (wt. %) | 0.00 | 0.00 | 0.00 | 0.00 | 0.00 | 0.00 | 0.00 |
| $Al_2O_3$ (wt. %) | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

TABLE 6-4

| | No. | | | | | | |
|---|---|---|---|---|---|---|---|
| | 22 | 23 | 24 | 25 | 26 | 27 | 28 |
| $SiO_2$ (wt. %) | 2.54 | 2.59 | 2.59 | 2.60 | 2.59 | 2.60 | 2.59 |
| $B_2O_3$ (wt. %) | 15.04 | 15.34 | 15.70 | 15.78 | 15.73 | 15.87 | 15.69 |
| $Li_2O$ (wt. %) | 0.00 | 0.00 | 0.00 | 0.00 | 0.00 | 0.00 | 0.00 |
| $Na_2O$ (wt. %) | 0.00 | 0.00 | 0.00 | 0.00 | 0.00 | 0.00 | 0.00 |
| $K_2O$ (wt. %) | 0.00 | 0.00 | 0.00 | 0.00 | 0.00 | 0.00 | 0.00 |
| MgO (wt. %) | 0.00 | 0.00 | 0.00 | 0.00 | 0.00 | 0.00 | 0.00 |
| CaO (wt. %) | 0.00 | 0.00 | 0.00 | 0.00 | 0.00 | 0.00 | 0.00 |
| SrO (wt. %) | 0.00 | 0.00 | 0.00 | 0.00 | 0.00 | 0.00 | 0.00 |
| BaO (wt. %) | 0.00 | 0.00 | 0.00 | 0.00 | 0.00 | 0.00 | 0.00 |
| ZnO (wt. %) | 18.70 | 19.07 | 19.03 | 19.13 | 18.61 | 18.66 | 18.56 |
| $La_2O_3$ (wt. %) | 32.02 | 32.66 | 28.92 | 29.06 | 28.99 | 29.07 | 28.88 |
| $Gd_2O_3$ (wt. %) | 0.00 | 0.00 | 0.00 | 0.00 | 0.00 | 0.00 | 0.00 |
| $Y_2O_3$ (wt. %) | 0.00 | 0.00 | 0.00 | 0.00 | 0.00 | 0.00 | 0.00 |
| $Yb_2O_3$ (wt. %) | 0.00 | 0.00 | 0.00 | 0.00 | 0.00 | 0.00 | 0.00 |
| $ZrO_2$ (wt. %) | 3.17 | 3.23 | 3.23 | 3.24 | 3.23 | 3.24 | 3.22 |
| $TiO_2$ (wt. %) | 1.17 | 1.19 | 1.19 | 1.20 | 1.19 | 1.20 | 0.74 |
| $Nb_2O_5$ (wt. %) | 13.93 | 17.21 | 15.68 | 16.51 | 17.21 | 16.88 | 17.91 |
| $Ta_2O_5$ (wt. %) | 11.37 | 6.61 | 11.57 | 10.38 | 10.35 | 10.38 | 10.32 |
| $WO_3$ (wt. %) | 2.06 | 2.10 | 2.09 | 2.10 | 2.10 | 2.10 | 2.09 |
| $TeO_2$ (wt. %) | 0.00 | 0.00 | 0.00 | 0.00 | 0.00 | 0.00 | 0.00 |
| $GeO_2$ (wt. %) | 0.00 | 0.00 | 0.00 | 0.00 | 0.00 | 0.00 | 0.00 |
| $Bi_2O_3$ (wt. %) | 0.00 | 0.00 | 0.00 | 0.00 | 0.00 | 0.00 | 0.00 |
| $Al_2O_3$ (wt. %) | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

TABLE 6-5

| | No. | | | | | | |
|---|---|---|---|---|---|---|---|
| | 29 | 30 | 31 | 32 | 33 | 34 | 35 |
| $SiO_2$ (wt. %) | 2.57 | 2.54 | 2.48 | 2.53 | 2.46 | 1.54 | 1.54 |
| $B_2O_3$ (wt. %) | 15.59 | 14.62 | 13.56 | 15.72 | 13.05 | 14.84 | 14.86 |
| $Li_2O$ (wt. %) | 0.00 | 0.00 | 0.00 | 0.00 | 0.00 | 0.00 | 0.00 |
| $Na_2O$ (wt. %) | 0.00 | 0.00 | 0.00 | 0.00 | 0.00 | 0.00 | 0.00 |
| $K_2O$ (wt. %) | 0.00 | 0.00 | 0.00 | 0.00 | 0.00 | 0.00 | 0.00 |
| MgO (wt. %) | 0.00 | 0.00 | 0.00 | 0.00 | 0.00 | 0.00 | 0.00 |
| CaO (wt. %) | 0.00 | 0.00 | 0.00 | 0.00 | 0.00 | 0.00 | 0.00 |

TABLE 6-5-continued

| | No. | | | | | | |
|---|---|---|---|---|---|---|---|
| | 29 | 30 | 31 | 32 | 33 | 34 | 35 |
| SrO (wt. %) | 0.00 | 0.00 | 0.00 | 0.00 | 0.00 | 0.00 | 0.00 |
| BaO (wt. %) | 0.00 | 0.00 | 0.00 | 0.00 | 0.00 | 0.00 | 0.00 |
| ZnO (wt. %) | 17.53 | 18.21 | 17.82 | 14.56 | 17.64 | 16.97 | 16.99 |
| $La_2O_3$ (wt. %) | 30.55 | 28.36 | 27.76 | 35.42 | 27.45 | 33.35 | 34.71 |
| $Gd_2O_3$ (wt. %) | 0.00 | 0.00 | 0.00 | 0.00 | 0.00 | 1.45 | 0.00 |
| $Y_2O_3$ (wt. %) | 0.00 | 0.00 | 0.00 | 0.00 | 0.00 | 0.00 | 0.00 |
| $Yb_2O_3$ (wt. %) | 0.00 | 0.00 | 0.00 | 0.00 | 0.00 | 0.00 | 0.00 |
| $ZrO_2$ (wt. %) | 3.20 | 3.16 | 3.10 | 3.15 | 3.06 | 3.32 | 3.33 |
| $TiO_2$ (wt. %) | 1.18 | 1.17 | 1.14 | 1.16 | 1.13 | 0.56 | 0.56 |
| $Nb_2O_5$ (wt. %) | 17.05 | 19.77 | 22.22 | 15.32 | 23.41 | 9.50 | 9.51 |
| $Ta_2O_5$ (wt. %) | 10.25 | 10.12 | 9.91 | 10.09 | 9.81 | 11.32 | 11.34 |
| $WO_3$ (wt. %) | 2.08 | 2.05 | 2.01 | 2.05 | 1.99 | 7.15 | 7.16 |
| $TeO_2$ (wt. %) | 0.00 | 0.00 | 0.00 | 0.00 | 0.00 | 0.00 | 0.00 |
| $GeO_2$ (wt. %) | 0.00 | 0.00 | 0.00 | 0.00 | 0.00 | 0.00 | 0.00 |
| $Bi_2O_3$ (wt. %) | 0.00 | 0.00 | 0.00 | 0.00 | 0.00 | 0.00 | 0.00 |
| $Al_2O_3$ (wt. %) | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

TABLE 6-6

| | No. | | | | | | |
|---|---|---|---|---|---|---|---|
| | 36 | 37 | 38 | 39 | 40 | 41 | 42 |
| $SiO_2$ (wt. %) | 1.55 | 3.64 | 1.51 | 1.50 | 1.52 | 1.53 | 1.51 |
| $B_2O_3$ (wt. %) | 14.94 | 11.62 | 14.58 | 14.45 | 14.67 | 14.74 | 14.61 |
| $Li_2O$ (wt. %) | 0.00 | 0.00 | 0.00 | 0.00 | 0.00 | 0.00 | 0.00 |
| $Na_2O$ (wt. %) | 0.00 | 0.00 | 0.00 | 0.00 | 0.00 | 0.00 | 0.00 |
| $K_2O$ (wt. %) | 0.00 | 0.00 | 0.00 | 0.00 | 0.00 | 0.00 | 0.00 |
| MgO (wt. %) | 0.00 | 0.00 | 0.00 | 0.00 | 0.00 | 0.00 | 0.00 |
| CaO (wt. %) | 0.00 | 0.00 | 0.00 | 0.00 | 0.00 | 0.00 | 0.00 |
| SrO (wt. %) | 0.00 | 0.00 | 0.00 | 0.00 | 0.00 | 0.00 | 0.00 |
| BaO (wt. %) | 0.00 | 0.00 | 0.00 | 0.00 | 0.00 | 0.00 | 0.00 |
| ZnO (wt. %) | 17.08 | 15.48 | 16.68 | 16.53 | 16.79 | 16.86 | 16.70 |
| $La_2O_3$ (wt. %) | 33.15 | 26.74 | 34.08 | 33.77 | 33.43 | 33.59 | 34.12 |
| $Gd_2O_3$ (wt. %) | 0.00 | 0.00 | 0.00 | 0.00 | 0.00 | 0.00 | 0.00 |
| $Y_2O_3$ (wt. %) | 1.21 | 0.00 | 0.00 | 0.00 | 0.00 | 0.00 | 0.00 |
| $Yb_2O_3$ (wt. %) | 0.00 | 0.00 | 0.00 | 0.00 | 0.00 | 0.00 | 0.00 |
| $ZrO_2$ (wt. %) | 3.35 | 2.98 | 3.27 | 3.24 | 3.29 | 3.30 | 3.27 |
| $TiO_2$ (wt. %) | 0.57 | 1.10 | 0.55 | 0.55 | 0.56 | 0.56 | 0.55 |
| $Nb_2O_5$ (wt. %) | 9.56 | 26.95 | 6.57 | 5.13 | 8.00 | 8.74 | 6.57 |
| $Ta_2O_5$ (wt. %) | 11.40 | 9.55 | 15.73 | 17.87 | 14.67 | 13.58 | 18.06 |
| $WO_3$ (wt. %) | 7.19 | 1.94 | 7.03 | 6.96 | 7.07 | 7.10 | 4.61 |
| $TeO_2$ (wt. %) | 0.00 | 0.00 | 0.00 | 0.00 | 0.00 | 0.00 | 0.00 |
| $GeO_2$ (wt. %) | 0.00 | 0.00 | 0.00 | 0.00 | 0.00 | 0.00 | 0.00 |
| $Bi_2O_3$ (wt. %) | 0.00 | 0.00 | 0.00 | 0.00 | 0.00 | 0.00 | 0.00 |
| $Al_2O_3$ (wt. %) | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

TABLE 6-7

| | No. | | | | | | |
|---|---|---|---|---|---|---|---|
| | 43 | 44 | 45 | 46 | 47 | 48 | 49 |
| $SiO_2$ (wt. %) | 1.50 | 2.46 | 2.64 | 3.26 | 2.96 | 2.94 | 2.75 |
| $B_2O_3$ (wt. %) | 14.46 | 12.69 | 16.27 | 15.30 | 15.90 | 16.12 | 15.70 |
| $Li_2O$ (wt. %) | 0.00 | 0.00 | 0.00 | 0.00 | 0.00 | 0.00 | 0.00 |
| $Na_2O$ (wt. %) | 0.00 | 0.00 | 0.00 | 0.00 | 0.00 | 0.00 | 0.00 |
| $K_2O$ (wt. %) | 0.00 | 0.00 | 0.00 | 0.00 | 0.00 | 0.00 | 0.00 |
| MgO (wt. %) | 0.00 | 0.00 | 0.00 | 0.00 | 0.00 | 0.00 | 0.00 |
| CaO (wt. %) | 0.00 | 0.00 | 0.00 | 0.00 | 0.00 | 0.00 | 0.00 |
| SrO (wt. %) | 0.00 | 0.00 | 0.00 | 0.00 | 0.00 | 0.00 | 0.00 |
| BaO (wt. %) | 0.00 | 0.00 | 0.00 | 0.00 | 0.00 | 0.00 | 0.00 |
| ZnO (wt. %) | 16.55 | 17.65 | 17.06 | 18.56 | 17.41 | 18.12 | 17.64 |
| $La_2O_3$ (wt. %) | 33.81 | 27.48 | 29.48 | 28.90 | 29.28 | 29.69 | 28.89 |
| $Gd_2O_3$ (wt. %) | 0.00 | 0.00 | 0.00 | 0.00 | 0.00 | 0.00 | 0.00 |
| $Y_2O_3$ (wt. %) | 0.00 | 0.00 | 0.00 | 0.00 | 0.00 | 0.00 | 0.00 |
| $Yb_2O_3$ (wt. %) | 0.00 | 0.00 | 0.00 | 0.00 | 0.00 | 0.00 | 0.00 |

TABLE 6-7-continued

| | No. | | | | | | |
|---|---|---|---|---|---|---|---|
| | 43 | 44 | 45 | 46 | 47 | 48 | 49 |
| $ZrO_2$ (wt. %) | 3.24 | 3.07 | 3.29 | 3.22 | 3.27 | 3.31 | 4.26 |
| $TiO_2$ (wt. %) | 0.55 | 2.84 | 0.00 | 1.19 | 1.21 | 1.59 | 1.19 |
| $Nb_2O_5$ (wt. %) | 5.14 | 22.01 | 20.73 | 17.16 | 17.39 | 17.63 | 17.16 |
| $Ta_2O_5$ (wt. %) | 20.18 | 9.81 | 10.53 | 10.32 | 10.46 | 10.60 | 10.32 |
| $WO_3$ (wt. %) | 4.57 | 1.99 | 0.00 | 2.09 | 2.12 | 0.00 | 2.09 |
| $TeO_2$ (wt. %) | 0.00 | 0.00 | 0.00 | 0.00 | 0.00 | 0.00 | 0.00 |
| $GeO_2$ (wt. %) | 0.00 | 0.00 | 0.00 | 0.00 | 0.00 | 0.00 | 0.00 |
| $Bi_2O_3$ (wt. %) | 0.00 | 0.00 | 0.00 | 0.00 | 0.00 | 0.00 | 0.00 |
| $Al_2O_3$ (wt. %) | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

TABLE 6-8

| No. | 50 | 51 |
|---|---|---|
| $SiO_2$(wt %) | 2.70 | 3.43 |
| $B_2O_3$(wt. %) | 15.40 | 15.50 |
| $Li_2O$(wt. %) | 0.00 | 0.00 |
| $Na_2O$(wt %) | 0.00 | 0.00 |
| $K_2O$(wt. %) | 0.00 | 0.00 |
| MgO(wt. %) | 0.00 | 0.00 |
| CaO(wt. %) | 0.00 | 0.00 |
| SrO(wt. %) | 0.00 | 0.00 |
| BaO(wt. %) | 0.00 | 0.00 |
| ZnO(wt. %) | 16.20 | 17.42 |
| $La_2O_3$(wt %) | 28.37 | 28.92 |
| $Gd_2O_3$(wt %) | 0.00 | 0.00 |
| $Y_2O_3$(wt. %) | 0.00 | 0.00 |
| $Yb_2O_3$(wt. %) | 0.00 | 0.00 |
| $ZrO_2$(wt. %) | 3.17 | 3.22 |
| $TiO_2$(wt. %) | 0.00 | 1.19 |
| $Nb_2O_5$(wt %) | 16.85 | 17.91 |
| $Ta_2O_5$(wt. %) | 10.13 | 10.32 |
| $WO_3$(wt. %) | 7.18 | 2.09 |
| $TeO_2$(wt. %) | 0.00 | 0.00 |
| $GeO_2$(wt. %) | 0.00 | 0.00 |
| $Bi_2O_3$(wt. %) | 0.00 | 0.00 |
| $Al_2O_3$(wt. %) | 0.00 | 0.00 |
| Total | 100.00 | 100.00 |

Optical glasses were measured for various properties by the following methods.

(1) Refractive indexes hd, ng, nF and nc and Abbe's number vd

A glass obtained by temperature decrease at a temperature decrease rate of −30° C./hour was measured for refractive indexes, nd, ng, nF, nc and an Abbe's number vd according to the refractivity measuring method of Japan Optical Glass Industrial Society Standard.

(2) Liquidus temperature LT

A glass was placed in a furnace heated to a predetermined temperature and held therein for 2 hours, and after it was cooled, the glass was internally observed through an optical microscope of 100 magnifications. The liquidus temperature of the glass was determined on the basis of whether or not a crystal was present.

(3) Glass transition temperature Tg and sag temperature Ts

A glass was measured at a temperature elevation rate of 4° C./minute with a thermomechanical analyzer supplied by Rigaku Corporation.

(4) Partial dispersion ratio Pg,F

A partial dispersion ratio was calculated from refractive indices ng, nF and nc.

(5) Deviation ΔPg,F of partial dispersion ratio from normal line

A deviation was calculated from a partial dispersion ratio $Pg,F^{(O)}$ on a normal line calculated from a partial dispersion ratio Pg,F and an Abbe's number vd.

(6) Specific gravity

A specific gravity was measured by an Archimedean method.

(7) λ70 and λ5

They were determined on the basis of spectral transmittances measured with a spectrophotometer.

(8) Precision press-moldability

Many preforms were made from a glass, and a press mold made of SiC was repeatedly used, or the preforms were continuously precision press-molded with the press mold made of SiC in a non-oxidizing atmosphere, to determine an average of the number of times of pressing that was permitted until glass was broken probably due to fusion of the press mold and the glass.

Instead of the above method, a glass is placed on a test a test board constituted of a material having a carbon content of 50 atomic % or more, the glass is heated and held together with the test board up to a temperature at which the glass comes to have a viscosity of $10^5$ to $10^9$ dPa·s, and then they are cooled to room temperature, and it is examined whether or not the test board and the glass are fused, whereby precision press-moldability can be known in a simple manner.

For example, many preforms were made from an optical glass No. 8 shown in Table 4-2, a press mold made of SiC was repeatedly used, or the preforms were continuously precision press-molded with the press mold made of SiC in a non-oxidizing atmosphere, to show that an average of the number of times of pressing that was permitted was 200 times or that stable precision press-molding was possible. A sample made of the same glass was placed on a test board, and the glass was heated and held together with the test board up to a temperature at which the glass came to have a viscosity of $10^5$ to $10^9$ dPa·s, and they then cooled to room temperature, to show no fusion between the test board and the glass. The cationic ratio $((Nb^{5+}+Ta^{5+})/(Ti^{4+}+Nb^{5+}+Ta^{5+}+W^{6+}))$ of the above optical glass No. 8 is 0.86.

On the other hand, when a glass having a cationic ratio $((Nb^{5+}+Ta^{5+})/(Ti^{4+}+Nb^{5+}+Ta^{5+}+W^{6+}))$ of 0.58 (to be referred to as "glass A") was repeatedly precision press-molded, an average of the number of times of pressing that was permitted was 60 times. Further, a test board was used, and when it was examined in the same manner as above whether or not the test board and the glass were fused, fusion was found.

As described above, it is seen that a glass that causes fusion to a test board shows that the number of times of pressing that is permitted in precision press-molding is far smaller than 100 times, but that a glass that is free from fusion to a test board is remarkably improved in the number of times of pressing that is permitted and has excellent precision press-moldability.

For studying how the cationic ratio $((Nb^{5+}+Ta^{5+})/(Ti^{4+}+Nb^{5+}+Ta^{5+}+W^{6+}))$ had an influence on precision press-moldability, a glass having a cationic ratio $((Nb^{5+}+Ta^{5+})/(Ti^{4+}+Nb^{5+}+Ta^{5+}+W^{6+}))$ of 0 (to be referred to as "glass I"), a glass having the above cationic ratio of 0.60 (to be referred to as "glass II"), and a glass having the above cationic ratio of 0.81 (to be referred to as "glass III") were placed on a testing board, heated, held thereon and then cooled to room temperature, and when they were examined as to whether or not they were fused, fusion was found in the glass I and the glass II, while no fusion was found in the glass III.

A glass having a cationic ratio $((Nb^{5+}+Ta^{5+})/(Ti^{4+}+Nb^{5+}+Ta^{5+}+W^{6+}))$ of 0 to 0.60 causes fusion to a test board, and its number of times of pressing that is permitted is small. However, when the above cationic ratio is 0.70 or more, no fusion to a test board is found, and the number of times of pressing that is permitted is remarkably improved.

In each of optical glasses shown in Tables 4-1 to 4-9, no fusion in the test using a test board is found, and they are glasses excellent in precision press-moldability.

Example 2

Glass raw materials formulated so as to give each of the optical glasses produced in Example 1 were melted, clarified and homogenized to prepare a molten glass, molten glass drops were caused to drop from a nozzle made of platinum, and each drop was received with a preform shaping mold, and shaped into a spherical preform while a gas pressure was applied thereto. In this manner, spherical preforms made of the above various optical glasses were shaped.

Further, the above molten glass was caused to continuously flow out of a pipe made of platinum, the lower end thereof was received with a preform shaping mold, and after a narrow portion was formed in the molten glass flow, the preform shaping mold was rapidly moved vertically downward to cut the glass flow in the narrow portion, and a separated molten glass mass was received on the preform shaping mold and shaped into a preform while causing it to float by applying a gas pressure. In this manner, preforms of the above various glasses were shaped. The thus-obtained preforms were optically homogeneous and had high quality.

The glass mass on the preform shaping mold may be pressed to form a preform having a form close to the form of an optical element to be produced. Preforms obtained by this method have smooth surfaces.

Example 3

Each molten glass prepared in Example 2 was caused to continuously flow out and cast into a casting mold to form a glass block, and it was annealed and cut to obtain a plurality of glass pieces. The glass pieces were ground and polished. Preforms formed of the above various glasses were produced in the above manner. The thus-obtained preforms were optically homogeneous and had high quality.

Example 4

The preforms produced in Examples 2 and 3 were surface-coated as required, and each preform was introduced into a press mold including upper and lower mold members made of SiC and a sleeve member and having molding surfaces coated with a carbon-containing release film, the mold and preform were heated together to soften the preform, and the preform was precision press-molded, in a nitrogen atmosphere. In this manner, various lenses formed of the above various glasses such as aspherical convex meniscus lenses, aspherical concave meniscus lenses, aspherical biconvex lenses and aspherical biconcave lenses were produced. Conditions of the precision press-molding were adjusted in the already described ranges.

When the thus-produced various lenses were observed, none of a scratch, a fogging and breaking was recognized on the lens surface of each.

When mass production tests of various lenses were carried out by repeating the above process, failures such as fusion of a glass and press mold, etc., did not take place, and lenses having high quality both on an outside and in inside each could be produced highly accurately. An anti-reflection film may be coated on the surface of each of the thus-obtained lenses.

Each of preforms that were the same as the above preforms was heated, softened and introduced into a pre-heated press mold and precision press-molded. In this manner, various lenses formed of the above various glasses such as aspherical convex meniscus lenses, aspherical concave meniscus lenses, aspherical biconvex lenses and aspherical biconcave lenses were produced. Conditions of the precision press-molding were adjusted in the already described ranges.

When the thus-produced various lenses were observed, no opacification caused by phase separation was found, and none of a scratch, a fogging and breaking was recognized on the lens surface of each.

When mass production tests of various lenses were carried out by repeating the above process, failures such as fusion of a glass and press mold, etc., did not take place, and lenses having high quality both on an outside and in inside each could be produced highly accurately. An anti-reflection film may be coated on the surface of each of the thus-obtained lenses.

When the form of molding surface(s) of a press mold is changed as required, various optical elements such as a prism, a microlens, a lens array, etc., can be produced as well.

Example 5

Various interchangeable lenses for single-lens reflex cameras having built-in lenses were prepared from those various lenses which were produced in Example 4.

Further, various optical systems for compact digital cameras were prepared from those various lenses which were produced in Example 4, and were formed into modules. Further, CCD or CMOS image sensors were attached these optical systems to be formed into modules.

When various lenses produced in Example 4 are used, high-function compact optical systems, interchangeable lenses, lens modules and image-sensing devices can be obtained as explained above. When lenses produced in Example 4 and lenses formed of high-refractivity high-dispersion glasses are combined, there can be obtained various optical systems capable of chromatic aberration correction of high order and image-sensing devices having such optical systems.

INDUSTRIAL APPLICABILITY

The optical glass of this invention has high-refractivity low-dispersion properties and excellent precision press-moldability and has a low glass transition temperature and is hence an optical glass suitable for precision press-molding. Further, it is an optical glass suitable for chromatic aberration correction of high order and is suitably used for producing precision press-molding preforms and optical elements.

The invention claimed is:

1. An optical glass comprising, by cationic %,
   20 to 50% of $B^{3+}$,
   0 to 10% of $Si^{4+}$,
   5 to 35% of $La^{3+}$,
   0 to 10% of $Gd^{3+}$,
   0 to 10% of $Y^{3+}$,
   0 to 10% of $Yb^{3+}$,
   0 to 4% of $Ti^{4+}$,
   1 to 30% of $Nb^{5+}$,
   0.5 to 15% of $Ta^{5+}$,
   0 to 5% of $W^{6+}$,
   0 to 10% of $Zr^{4+}$,
   11 to 40% of $Zn^{2+}$,
   0 to 10% of $Mg^{2+}$,
   0 to 10% of $Ca^{2+}$,
   0 to 10% of $Sr^{2+}$,
   0 to 10% of $Ba^{2+}$,
   0 to 10% of $Li^+$,
   0 to 10% of $Na^+$,
   0 to 10% of $K^+$,
   0 to 10% of $Te^{4+}$,
   0 to 10% of $Ge^{4+}$,
   0 to 10% of $Bi^{3+}$, and
   0 to 10% of $Al^{3+}$,
   the total content of $B^{3+}$ and $Si^{4+}$ ($B^{3+}+Si^{4+}$) being 20 to 50%,
   the total content of $La^{3+}$, $Gd^{3+}$ and $Y^{3+}$ ($La^{3+}+Gd^{3+}+Y^{3+}$) being 5 to 35%,
   the cationic ratio of (($B^{3+}+Si^{4+}$)/($La^{3+}+Gd^{3+}+Y^{3+}$)) being from 1 to 5,
   the total content of $Ti^{4+}$, $Nb^{5+}$, $Ta^{5+}$ and $W^{6+}$ ($Ti^{4+}+Nb^{5+}+Ta^{5+}+W^{6+}$) being 10 to 35%,
   the cationic ratio of (($Nb^{5+}+Ta^{5+}$)/($Ti^{4+}+Nb^{5+}+Ta^{5+}+W^{6+}$)) being from 0.7 to 1,
   the cationic ratio of (($B^{3+}+Si^{4+}$)/($Ti^{4+}+Nb^{5+}+Ta^{5+}+W^{6+}$)) being from 0.5 to 4,
   the cationic ratio of (($La^{3+}+Gd^{3+}+Y^{3+}$)/($Ti^{4+}+Nb^{5+}+Ta^{5+}+W^{6+}$)) being from 0.2 to 3,
   the cationic ratio of the content of $Zn^{2+}$ to the total content of $Zn^{2+}$, $Mg^{2+}$, $Ca^{2+}$, $Sr^{2+}$ and $Ba^{2+}$ ($Zn^{2+}/(Zn^{2+}+Mg^{2+}+Ca^{2+}+Sr^{2+}+Ba^{2+})$) being from 0.8 to 1,
   the optical glass having a refractive index nd of 1.89 or more and an Abbe's number vd of 27 to 37.

2. The optical glass of claim 1, wherein the total content of $Nb^{5+}$ and $Ta^{5+}$ ($Nb^{5+}+Ta^{5+}$) is 5 to 35 cationic %, and the total content of $Ti^{4+}$ and $W^{6+}$ ($Ti^{4+}+W^{6+}$) is 0 to 6 cationic %.

3. The optical glass of claim 1, which has a glass transition temperature of 630° C. or lower.

4. The optical glass of claim 1, which has a liquidus temperature of 1,200° C. or lower.

5. The optical glass of claim 1, which has a partial dispersion ratio Pg,F having a deviation ΔPg,F of 0.006 or less.

6. A precision press-molding preform formed of the optical glass recited in claim 5.

7. An optical element formed of the optical glass recited in claim 1.

8. A process for producing an optical element, which comprises heating the precision press-molding preform recited in claim 6 and precision press-molding the precision press-molding preform with a press mold.

9. The optical glass of claim 1, which is a glass that is not fused to a testing board in a test in which it is placed on the testing board composed of a material having a carbon content of 50 atomic % or more, heated and held together with the testing board up to a temperature at which the glass comes to have a viscosity of $10^5$ to $10^9$ dPa·s and then cooled to room temperature.

10. The optical glass of claim 9, which has a refractive index nd of 1.89 or more, an Abbe's number vd of 27 or more but less than 31 and an $Nb^{5+}$ content of 5 to 30%.

11. The optical glass of claim 9, which has a refractive index nd of 1.89 or more, an Abbe's number vd of 27 or more but less than 31 and a $W^{6+}$ content of 0 to 3.5%.

12. The optical glass of claim 1, which has a refractive index nd of 1.89 or more, an Abbe's number vd of 27 or more but less than 31, an $Nb^{5+}$ content of 5 to 30% and a $W^{6+}$ content of 0 to 3.5%.

13. The optical glass of claim 1, which has a refractive index nd of 1.89 or more, an Abbe's number vd of 31 to 33 and an $Nb^{5+}$ content of 5 to 20%.

14. The optical glass of claim 1, which has a refractive index nd of 1.89 or more, an Abbe's number vd of 31 to 33 and a $W^{6+}$ content of 0 to 3.5%.

15. The optical glass of claim 1, which has a refractive index nd of 1.89 or more, an Abbe's number vd of 31 to 33, an $Nb^{5+}$ content of 5 to 20% and a $W^{6+}$ content of 0 to 3.5%.

16. The optical glass of claim 1, which has a refractive index nd of 1.89 or more, an Abbe's number vd of over 33 but 37 or less and a $Ta^{5+}$ content of 3 to 13%.

17. The optical glass of claim 1, which has a refractive index nd of 1.89 or more, an Abbe's number vd of over 33 but 37 or less and a $W^{6+}$ content of 0 to 3.5%.

18. The optical glass of claim 1, which has a refractive index nd of 1.89 or more, an Abbe's number vd of over 33 but 37 or less, a $Ta^{5+}$ content of 3 to 13% and a W content of 0 to 3.5%.

19. The optical glass of claim 9, which has a refractive index nd of 1.89 or more, an Abbe's number vd of 27 or more but less than 31, an $Nb^{5+}$ content of 5 to 30% and a $W^{6+}$ content of 0 to 3.5%.

20. The optical glass of claim 9, which has a refractive index nd of 1.89 or more, an Abbe's number vd of 31 to 33 and an $Nb^{5+}$ content of 5 to 20%.

21. The optical glass of claim 9, which has a refractive index nd of 1.89 or more, an Abbe's number vd of 31 to 33 and a $W^{6+}$ content of 0 to 3.5%.

22. The optical glass of claim 9, which has a refractive index nd of 1.89 or more, an Abbe's number vd of 31 to 33, an $Nb^{5+}$ content of 5 to 20% and a $W^{6+}$ content of 0 to 3.5%.

23. The optical glass of claim 9, which has a refractive index nd of 1.89 or more, an Abbe's number vd of over 33 but 37 or less and a $Ta^{5+}$ content of 3 to 13%.

24. The optical glass of claim 9, which has a refractive index nd of 1.89 or more, an Abbe's number vd of over 33 but 37 or less and a $W^{6+}$ content of 0 to 3.5%.

25. The optical glass of claim 9, which has a refractive index nd of 1.89 or more, an Abbe's number vd of over 33 but 37 or less, a $Ta^{5+}$ content of 3 to 13% and a $W^{6+}$ content of 0 to 3.5%.

* * * * *